US012784674B2

(12) United States Patent
Ohshitanai

(10) Patent No.: US 12,784,674 B2
(45) Date of Patent: Nov. 3, 2026

(54) LIGHT EMITTING APPARATUS, IMAGE FORMING APPARATUS, DISPLAY APPARATUS, PHOTOELECTRIC CONVERSION APPARATUS, ELECTRONIC DEVICE, ILLUMINATION APPARATUS, MOVING BODY, AND WEARABLE DEVICE

(71) Applicant: CANON KABUSHIKI KAISHA, Tokyo (JP)

(72) Inventor: Kazuki Ohshitanai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/039,028

(22) Filed: Jan. 28, 2025

(65) Prior Publication Data

US 2025/0265984 A1 Aug. 21, 2025

(30) Foreign Application Priority Data

Feb. 15, 2024 (JP) ................................ 2024-021447

(51) Int. Cl.
*G09G 3/3225* (2016.01)

(52) U.S. Cl.
CPC ... *G09G 3/3225* (2013.01); *G09G 2300/0426* (2013.01); *G09G 2300/0828* (2013.01);
(Continued)

(58) Field of Classification Search
CPC ...... G06F 3/041–047; G06F 2203/041–04114; H10K 59/00–95; G09G 2320/0223; G09G 2300/0426; G09G 3/32; G09G 3/3275; G09G 3/3208; G09G 2310/027; G09G 3/3291; G09G 2330/028; G09G 3/3696; G09G 2310/0291; G09G 2320/045; G09G 2320/0276; G09G 2310/0294; G09G 2300/0819; G09G 2320/0233; G09G 2320/0247
See application file for complete search history.

(56) References Cited

U.S. PATENT DOCUMENTS

| | | | |
|---|---|---|---|
| 7,425,937 | B2 | 9/2008 | Inukai |
| 10,395,609 | B2 | 8/2019 | Takahashi |

(Continued)

FOREIGN PATENT DOCUMENTS

| | | |
|---|---|---|
| JP | 2004-077567 A | 3/2004 |
| JP | 2011-013510 A | 1/2011 |

(Continued)

*Primary Examiner* — Sanjiv D. Patel
(74) *Attorney, Agent, or Firm* — Venable LLP

(57) ABSTRACT

A light emitting apparatus includes a pixel array portion including a plurality of pixels, and a plurality of signal lines extending in a column direction. Each of the signal lines is divided into a plurality of sub-signal lines, the apparatus is configured such that, to the pixels of the same column, a signal generated using an output signal from the same reference voltage generation circuit is supplied via a corresponding sub-signal line, the apparatus includes first and second substrates, which are stacked on each other, the first substrate includes the pixel array portion, and the second substrate includes a signal output circuit configured to output the signal, and a signal line switching circuit configured to switch a connection destination of an output of the signal output circuit between the sub-signal lines.

14 Claims, 16 Drawing Sheets

(52) U.S. Cl.
CPC . *G09G 2310/08* (2013.01); *G09G 2320/0223* (2013.01); *G09G 2330/028* (2013.01)

(56) References Cited

U.S. PATENT DOCUMENTS

| | | | | |
|---|---|---|---|---|
| 2004/0041754 | A1 | 3/2004 | Inukai | |
| 2007/0216613 | A1* | 9/2007 | Ogura | G09G 3/3233 345/76 |
| 2013/0321251 | A1* | 12/2013 | Kang | G09G 3/3614 345/87 |
| 2018/0226034 | A1 | 8/2018 | Takahashi | |
| 2019/0005905 | A1* | 1/2019 | Chen | G09G 3/3618 |
| 2019/0279571 | A1* | 9/2019 | Oulee | G09G 3/2088 |
| 2020/0143741 | A1* | 5/2020 | Tsuboi | G09G 3/3233 |
| 2021/0109700 | A1* | 4/2021 | Yueh | G06F 3/147 |
| 2023/0005400 | A1* | 1/2023 | Endo | G09G 3/006 |
| 2023/0090509 | A1* | 3/2023 | Kato | G09G 3/3233 345/690 |
| 2023/0215384 | A1* | 7/2023 | Kim | G09G 3/3233 345/690 |

FOREIGN PATENT DOCUMENTS

| | | | |
|---|---|---|---|
| JP | 2018-124550 | A | 8/2018 |
| JP | 2021-086017 | A | 6/2021 |

* cited by examiner

LIGHT EMITTING APPARATUS, IMAGE FORMING APPARATUS, DISPLAY APPARATUS, PHOTOELECTRIC CONVERSION APPARATUS, ELECTRONIC DEVICE, ILLUMINATION APPARATUS, MOVING BODY, AND WEARABLE DEVICE

BACKGROUND OF THE INVENTION

Field of the Invention

The present disclosure relates to a light emitting apparatus, an image forming apparatus, a display apparatus, a photoelectric conversion apparatus, an electronic device, an illumination apparatus, a moving body, and a wearable device.

Description of the Related Art

There is known a light emitting apparatus or display apparatus using a light emitting element such as an organic light emitting diode (OLED). Japanese Patent Laid-Open No. 2004-077567 discloses a configuration that shortens a write time by supplying video signals to the upper half and the lower half of a pixel array portion via different data lines.

In the configuration described in Japanese Patent Laid-Open No. 2004-077567, however, since signals are supplied from different driving circuits to the signal lines of the upper half and the lower half of pixels in the same column, a characteristic difference is generated between the upper half and the lower half of the pixel array portion.

SUMMARY OF THE INVENTION

The present disclosure provides a technique advantageous in reducing a characteristic difference between regions of a pixel array portion.

The present invention in its one aspect provides a light emitting apparatus including a pixel array portion including a plurality of pixels arrayed to form a plurality of rows and a plurality of columns, and a plurality of signal lines extending in a column direction, wherein each of the plurality of signal lines is divided into a plurality of sub-signal lines, the light emitting apparatus is configured such that, to the pixels of the same column, a signal generated using an output signal from the same reference voltage generation circuit is supplied via a corresponding sub-signal line, the light emitting apparatus includes a first substrate and a second substrate, which are stacked on each other, the first substrate includes the pixel array portion, and the second substrate includes a signal output circuit configured to output the signal, and a signal line switching circuit configured to switch a connection destination of an output of the signal output circuit between the plurality of sub-signal lines.

Further features of the present invention will become apparent from the following description of exemplary embodiments (with reference to the attached drawings).

DESCRIPTION OF THE EMBODIMENTS

Figure 1:
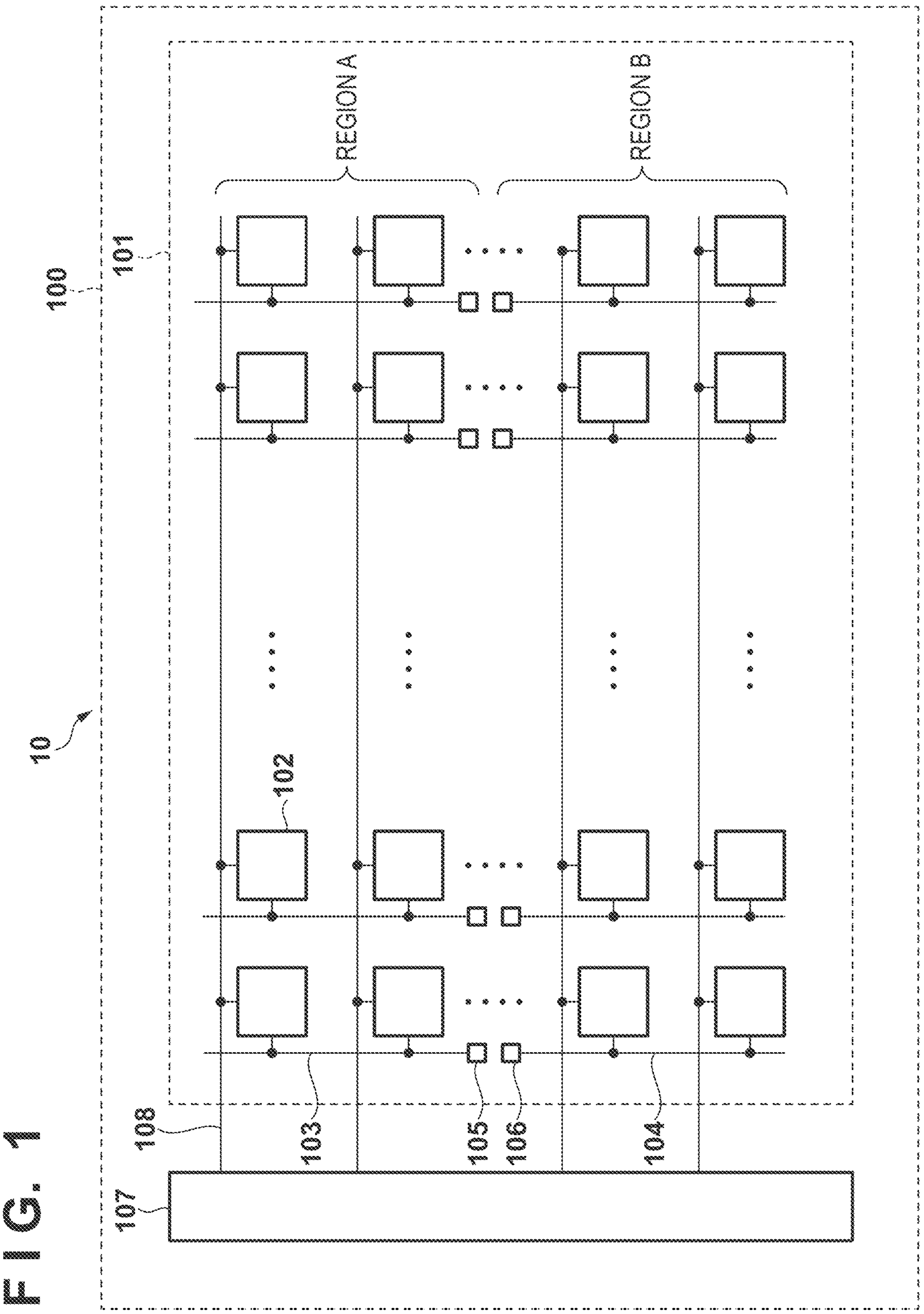
FIG. 1 is a view showing the configuration of the pixel substrate of a light emitting apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

A light emitting apparatus according to the first embodiment will be described with reference to FIGS. 1 to 3. Note that all the following embodiments show examples of the present invention, and numerical values, shapes, materials, constituent elements, arrangements and connection forms of the constituent elements, and the like are not intended to limit the scope of the present invention.

Figure 2:
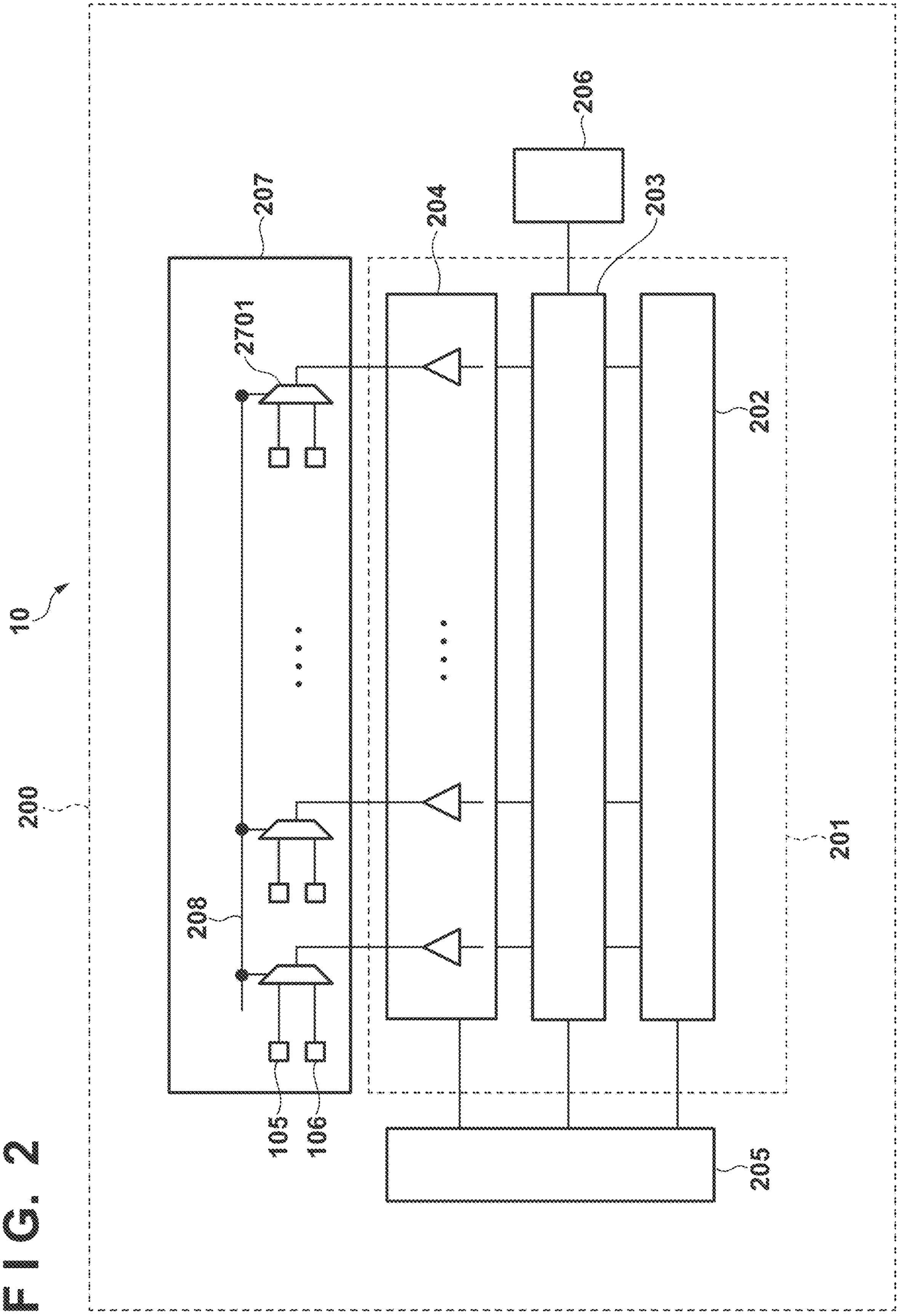
FIG. 2 is a view showing the configuration of the circuit board of the light emitting apparatus.

FIGS. 1 and 2 are schematic views showing a light emitting apparatus 10 according to this embodiment. The light emitting apparatus 10 includes a pixel substrate 100 (first substrate) and a circuit board 200 (second substrate), which are stacked on each other. FIG. 1 shows the configuration of the pixel substrate 100, and FIG. 2 shows the configuration of the circuit board 200. A pixel array portion 101 is formed on the pixel substrate 100. The pixel array portion 101 includes a plurality of pixels 102 that are arrayed to form a plurality of rows and a plurality of columns. Each of the plurality of pixels 102 includes a light emitting diode (light emitting element) and emits light in a light emitting amount corresponding to an input luminance signal voltage.

To each of the plurality of pixels 102, a luminance signal voltage Vsig that is an image signal is input from a signal output circuit via a signal line.

The pixel array portion 101 includes a plurality of signal lines extending in the column direction. In this embodiment, as shown in FIG. 1, each of the plurality of signal lines is divided into a plurality of sub-signal lines. Here, consider two regions obtained by dividing a region including the plurality of pixels 102 into two parts by a line parallel to the row direction. One of the two regions is defined as a region A (first region), and the other is defined as a region B (second region). The region A includes a plurality of first sub-signal lines 103, and the region B includes a plurality of second sub-signal lines 104. Conventionally, one signal line extending in the column direction is arranged for one column of pixels in the pixel array portion. "Sub-signal lines" mean signal lines divided for each region. An image signal is input to each pixel in the region A via the sub-signal line 103, and an image signal is input to each pixel in the region B via the sub-signal line 104. The "sub-signal line" will simply be referred to as a "signal line" hereinafter. The signal line 103 (first sub-signal line) is connected to a circuit on the circuit board 200 via a first connecting portion 105, and the signal line 104 (second sub-signal line) is connected to a circuit on the circuit board 200 via a second connecting portion 106.

A control signal 108 is input from a vertical scanning circuit 107 to each pixel via a scanning line. The control signal 108 is active at LOW, and the potential of the signal line 103 is written to the pixel 102. The control signal 108 is nonactive at HIGH, and the signal line 103 and the pixel 102 are disconnected. The vertical scanning circuit 107 is formed on the pixel substrate 100, like the example shown in FIG. 1, but may be formed on the circuit board 200.

Note that each of the plurality of pixels 102 may include a plurality of sub-pixels arranged on a color basis. In this case, a signal line is arranged for each column with respect to each sub-pixel as a reference. For example, if one pixel includes three sub-pixels, three signal lines can be arranged for one pixel column.

A signal output circuit 201 is formed on the circuit board 200. The signal output circuit 201 can include a horizontal scanning circuit 202, a column DAC circuit 203 arranged for a plurality of columns, and a column driver circuit 204 arranged for a plurality of columns. The vertical scanning circuit 107 and the signal output circuit 201 are controlled by a control circuit 205.

A signal line switching circuit 207 is further formed on the circuit board 200. The signal line switching circuit 207 switches the connection destination of the output of the signal output circuit 201 between a plurality of sub-signal lines. More specifically, the signal line switching circuit 207 switches whether to output a signal output from the column driver circuit 204 to the signal line 103 in the region A via the first connecting portion 105 or output the signal to the signal line 104 in the region B via the second connecting portion 106. The signal line switching circuit 207 is controlled by a switching control signal 208. For example, when the switching control signal 208 is at LOW, the signal line switching circuit 207 is connected to the signal line 103 in the region A. When the switching control signal 208 is at HIGH, the signal line switching circuit 207 is connected to the signal line 104 in the region B. In an example, the signal line switching circuit 207 can include a plurality of selectors 2071 configured to select, for each pixel column, the signal lines 103 in the region A or the signal lines 104 in the region B as the connection destination of the output of the signal output circuit 201.

In this embodiment, one column DAC circuit 203 and one column driver circuit 204 correspond to each other. The column DAC circuit 203 converts image data scanned by the horizontal scanning circuit 202 and input to each pixel column into an analog signal and supplies it to the column driver circuit 204. The column driver circuit 204 outputs a luminance signal (luminance signal voltage Vsig) according to an output signal from the column DAC circuit 203.

A reference voltage generation circuit 206 is further formed on the circuit board 200. The reference voltage generation circuit 206 generates analog voltages Vref in number according to the image data (for example, 256 analog voltages if the image data is 8-bit data), and supplies these to the column DAC circuit 203. Also, the reference voltage generation circuit 206 may generate a reference voltage Vcal to be used for variation correction of the signal output circuit 201 and the pixels 102. At this time, the reference voltage Vcal may be supplied to the pixels 102 via the column driver circuit 204 and the signal lines 103 and 104.

Figure 3:
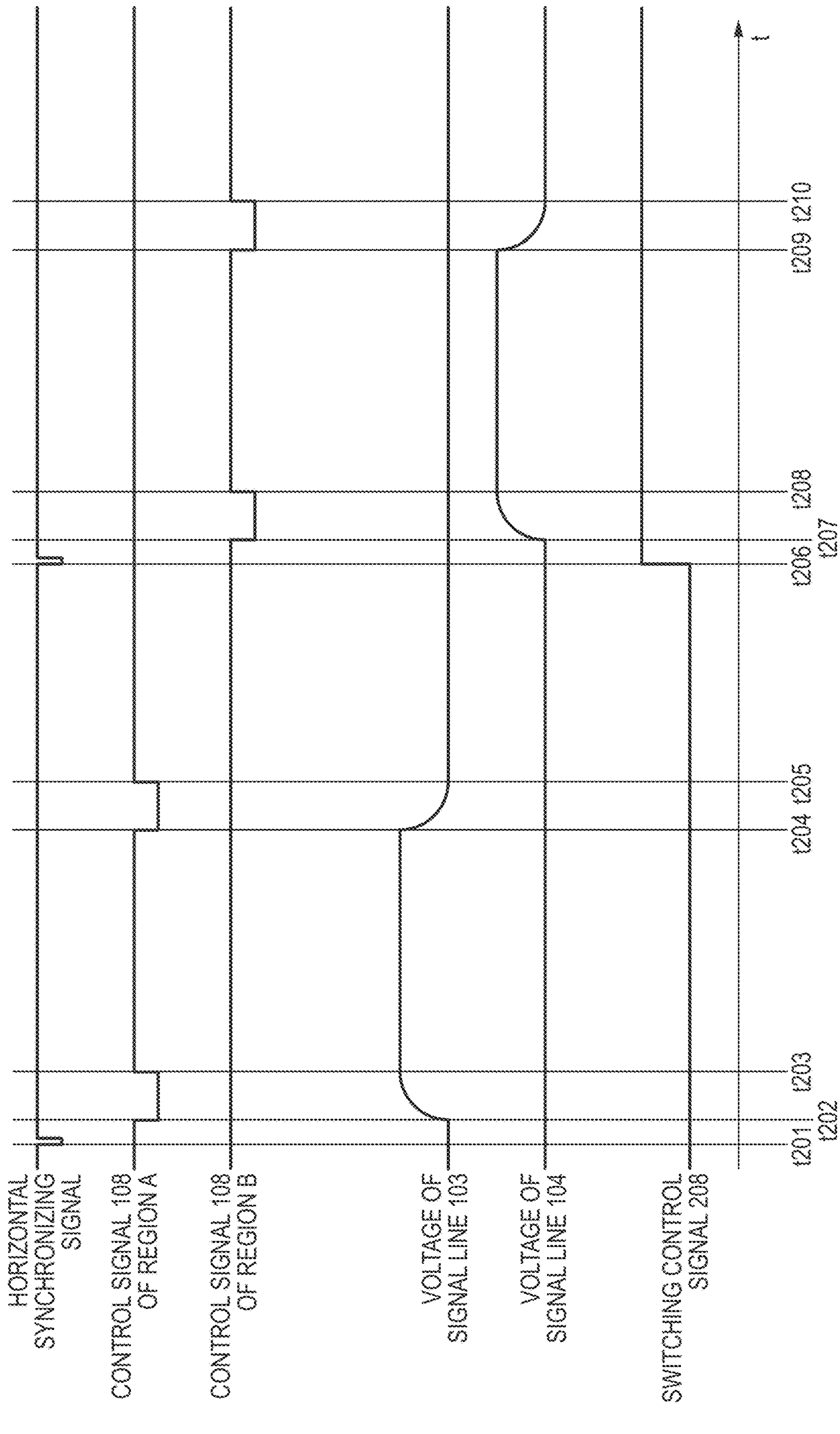
FIG. 3 is a timing chart showing an example of the operation of the light emitting apparatus.

FIG. 3 is a timing chart showing an example of the operation of the light emitting apparatus 10 according to this embodiment. Referring to FIG. 3, a horizontal synchronizing signal indicates a horizontal scanning period of the nth row, and a reset period and a signal write period are included in the horizontal scanning period. In the period from time t201 to time t206, the pixels in the region A connected to the signal lines 103 are scanned, and in the period from time t206, the pixels in the region B connected to the signal lines 104 are scanned.

At time t201, scanning of the pixels in the region A of the pixel array portion 101 is started by the horizontal synchronizing signal. At this time, the switching control signal 208 is at LOW, and the output of the column driver circuit 204 is connected to the signal line 103 in the region A by the signal line switching circuit 207.

At time t202, the column driver circuit 204 outputs a reset potential. Writing of a reset voltage to the pixels 102 is thus started. A standby time until the signal line 103 reaches the reset potential is needed, and the settling time at this time is represented by $\tau = CR$, where C is the capacitance of the signal line, and R is the resistance of the signal line. In addition, the control signal 108 changes to LOW, and the reset potential of the signal line 103 is written to the pixels 102.

At time t203, the control signal 108 changes to HIGH, and the writing of the reset voltage to the pixels 102 is ended. The period from time t202 to time t203 is the reset period.

At time t204, the column driver circuit 204 outputs a luminance signal potential. At this time, the switching control signal 208 is at LOW, and the output of the column driver circuit 204 is connected to the signal line 103 in the region A by the signal line switching circuit 207. Writing of the luminance signal voltage to the pixels 102 is thus started. Like the reset potential, a settling time is needed until the signal line reaches the luminance signal potential. In addition, the control signal 108 changes to LOW, and the luminance signal potential of the signal line 103 is written to the pixels 102. The light emitting element provided in the pixel 102 emits light in a light emitting amount corresponding to the input luminance signal voltage.

At time t205, the control signal 108 changes to HIGH, and the writing of the luminance signal voltage to the pixels 102 is ended. The period from time t204 to time t205 is the signal write period.

At time t206, scanning of the pixels in the region B of the pixel array portion 101 is started by the horizontal synchronizing signal. At this time, the switching control signal 208 changes to HIGH, and the output of the column driver circuit 204 is connected to the signal line 104 in the region B.

The period from time t207 to time t208 is the reset period, like the period from time t202 to time t203, and the reset potential of the signal line 104 is written to the pixels in the region B.

The period from time t209 to time t210 is the signal write period, like the period from time t204 to time t205, and the luminance signal potential of the signal line 104 is written to the pixels in the region B.

Here, one column DAC circuit 203 and one column driver circuit 204 may correspond to one sub-pixel column or a plurality of sub-pixel columns.

As described above, according to this embodiment, each of the plurality of signal lines extending in the column direction is divided into a plurality of sub-signal lines. To the pixels of the same column, a signal generated using the output signal from the same reference voltage generation circuit is supplied via a corresponding sub-signal line. The "signal generated using the output signal from the same reference voltage generation circuit" can be, for example, the output signal from the column DAC circuit 203, which is generated based on the output from the reference voltage generation circuit 206. Alternatively, the "signal generated using the output signal from the same reference voltage generation circuit" can be a luminance signal output from the column driver circuit 204 in accordance with the output signal from the column DAC circuit 203.

According to this embodiment, to the pixels of the same column, a signal generated using the output signal from the same reference voltage generation circuit is supplied via a corresponding sub-signal line. This can reduce the characteristic difference of pixels between the region A and the region B.

Figure 9:
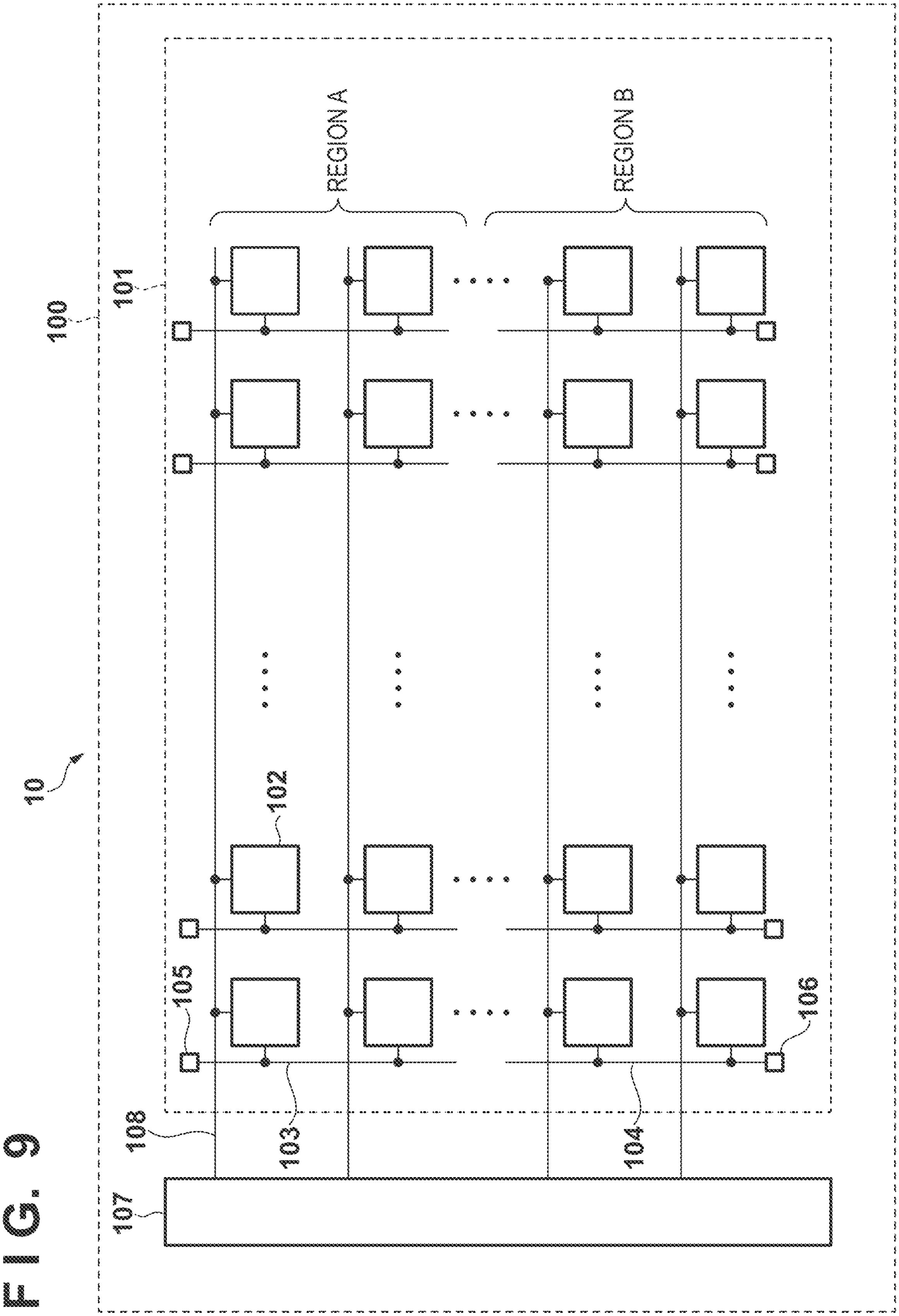
FIG. 9 is a view showing the configuration of the pixel substrate of the light emitting apparatus.

Note that in the example shown in FIG. 1, the first connecting portion 105 and the second connecting portion 106 are provided at the end portions of the signal line 103 (first sub-signal line) and the signal line 104 (second sub-signal line) on the sides close to each other. However, the positions of the first connecting portion 105 and the second connecting portion 106 are not limited to this. For example, as shown in FIG. 9, the first connecting portion 105 and the second connecting portion 106 may be provided at the end portions of the signal line 103 and the signal line 104 on the sides far apart from each other.

Second Embodiment

A light emitting apparatus according to the second embodiment will be described with reference to FIGS. 4 to 6. Matters that are not mentioned in the second embodiment can comply with the first embodiment as far as they are not incompatible.

A light emitting apparatus 10 includes a pixel substrate 100 (first substrate) and a circuit board 200 (second substrate), which are stacked on each other, as in the first embodiment. FIG. 4 shows the configuration of the pixel substrate 100, and FIG. 5 shows the configuration of the circuit board 200.

Figure 4:
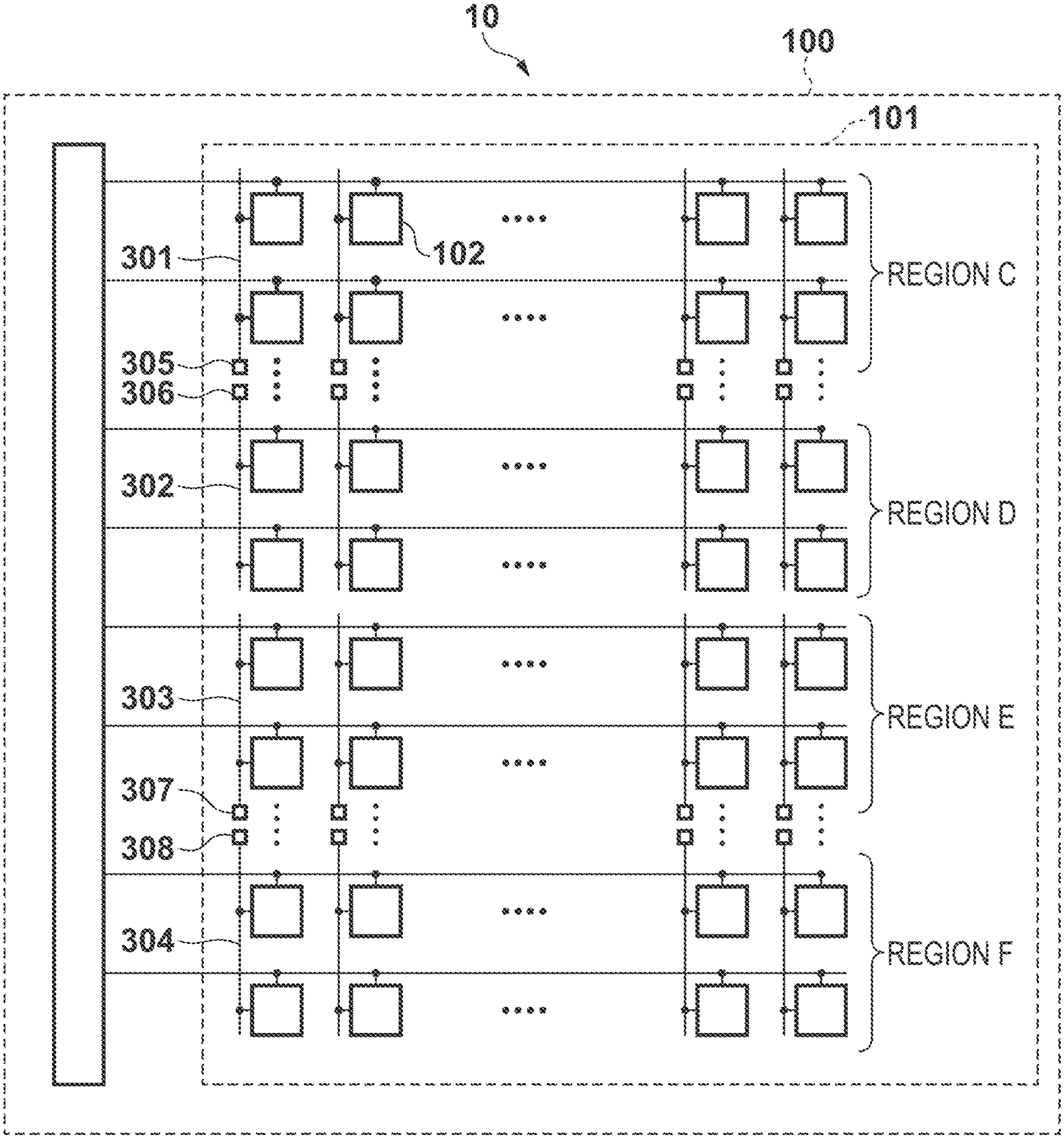
FIG. 4 is a view showing the configuration of the pixel substrate of a light emitting apparatus.
Figure 5:
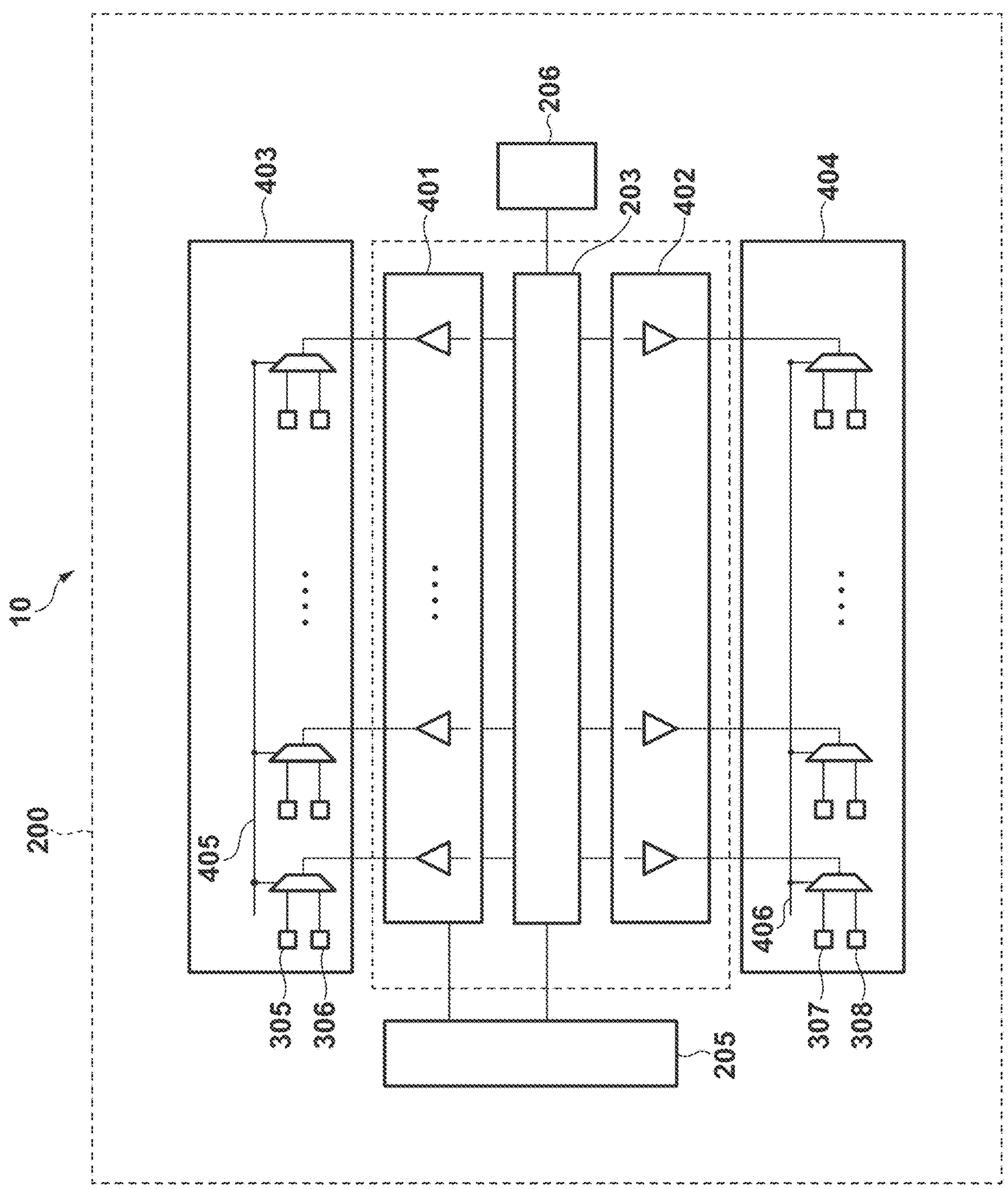
FIG. 5 is a view showing the configuration of the circuit board of the light emitting apparatus.

In the second embodiment, as shown in FIG. 4, a pixel array portion 101 includes four regions obtained by dividing a region including a plurality of pixels 102 into four parts by lines parallel to the row direction. Here, the four regions include a region C (first region), a region D (second region), a region E (third region), and a region F (fourth region). The region C includes a plurality of first sub-signal lines 301, the region D includes a plurality of second sub-signal lines 302, the region E includes a plurality of third sub-signal lines 303, and the region F includes a plurality of fourth sub-signal lines 304. An image signal is input to each pixel in the region C via the sub-signal line 301, and an image signal is input to each pixel in the region D via the sub-signal line 302. Also, an image signal is input to each pixel in the region E via the sub-signal line 303, and an image signal is input to each pixel in the region F via the sub-signal line 304. As in the first embodiment, the "sub-signal line" will simply be referred to as a "signal line" hereinafter. The signal line 301 (first sub-signal line) is connected to a circuit on the circuit board 200 via a first connecting portion 305, and the signal line 302 (second sub-signal line) is connected to a circuit on the circuit board 200 via a second connecting portion 306. Also, the signal line 303 (third sub-signal line) is connected to a circuit on the circuit board 200 via a third connecting portion 307, and the signal line 304 (fourth sub-signal line) is connected to a circuit on the circuit board 200 via a fourth connecting portion 308.

Unlike the first embodiment, the signal output circuit of the circuit board 200 includes two column driver circuits 401 and 402 and two signal line switching circuits 403 and 404. The signal line switching circuit 403 switches whether to output a signal output from the column driver circuit 401 to the signal line 301 via the first connecting portion 305 or output the signal to the signal line 302 via the second connecting portion 306. The signal line switching circuit 403 is controlled by a switching control signal 405. The signal line switching circuit 404 switches whether to output a signal output from the column driver circuit 402 to the signal line 303 via the third connecting portion 307 or output the signal to the signal line 304 via the fourth connecting portion 308. The signal line switching circuit 404 is controlled by a switching control signal 406.

In this embodiment, one column DAC circuit 203 and two column driver circuits 401 and 402 correspond to each other.

Figure 6:
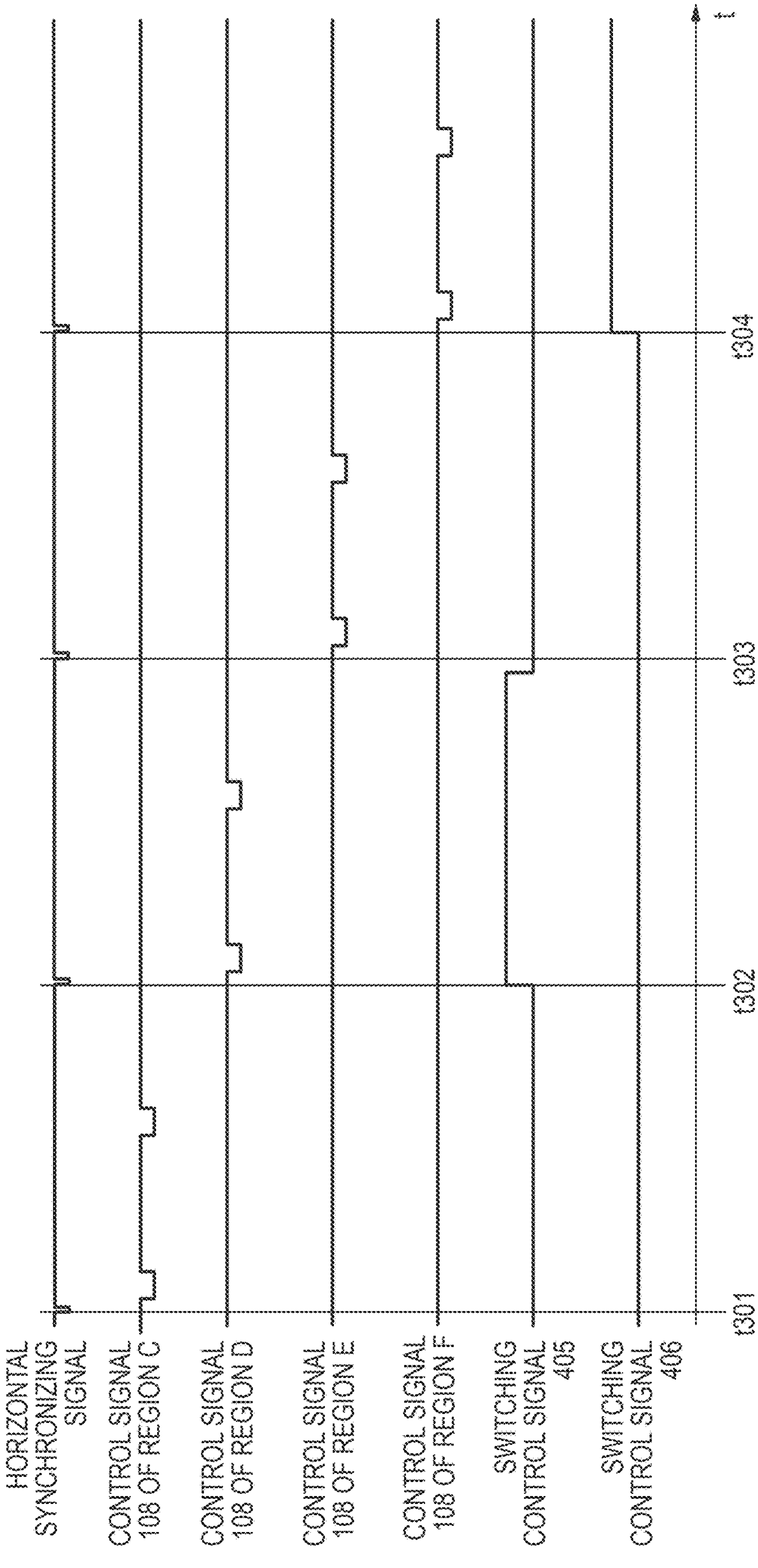
FIG. 6 is a timing chart showing an example of the operation of the light emitting apparatus.

FIG. 6 is a timing chart showing an example of the operation of the light emitting apparatus 10 according to this embodiment.

In the period from time t301 to time t302, the region C of the pixel array portion 101 connected to the signal lines 301 is scanned. At time t301, scanning of the region C of the pixel array portion 101 is started by the horizontal synchronizing signal. At this time, the switching control signal 405 is at LOW, and the output of the column driver circuit 401 is connected to the signal line 301 in the region C by the signal line switching circuit 403. The reset period and the signal write period of the pixels of each row of the region C are thus sequentially scanned.

In the period from time t302 to time t303, the region D of the pixel array portion 101 connected to the signal lines 302 is scanned. At time t302, scanning of the region D of the pixel array portion 101 is started by the horizontal synchronizing signal. At this time, the switching control signal 405 is at HIGH, and the output of the column driver circuit 401 is connected to the signal line 302 in the region D by the signal line switching circuit 403. The reset period and the signal write period of the pixels of each row of the region D are thus sequentially scanned.

In the period from time t303 to time t304, the region E of the pixel array portion 101 connected to the signal lines 303 is scanned. At time t303, scanning of the region E of the pixel array portion 101 is started by the horizontal synchronizing signal. At this time, the switching control signal 406 is at LOW, and the output of the column driver circuit 402 is connected to the signal line 303 in the region E by the signal line switching circuit 404. The reset period and the signal write period of the pixels of each row of the region E are thus sequentially scanned.

In the period after time t304, the region F of the pixel array portion 101 connected to the signal lines 304 is scanned. At time t304, scanning of the region F of the pixel array portion 101 is started by the horizontal synchronizing signal. At this time, the switching control signal 406 is at HIGH, and the output of the column driver circuit 402 is connected to the signal line 304 in the region F by the signal line switching circuit 404. The reset period and the signal write period of the pixels of each row of the region F are thus sequentially scanned.

In the above-described example, scanning is sequentially performed for the regions C, D, E, and F. However, after the regions C and E are scanned in parallel, the regions D and F may be scanned in parallel.

As described above, since the number of divided signal lines is increased as compared to the first embodiment, the time constant of the signal lines becomes short, and the reset period and the signal write period can be shortened.

Also, in this embodiment, connection between the outputs of the column driver circuits 401 and 402 and the four divided signal lines 301, 302, 303, and 304 is switched by the signal line switching circuits 403 and 404, thereby supplying signals to the pixels in the regions C, D, E, and F. At this time, the characteristic difference of the pixels can be reduced by supplying signals from the column driver circuit 204 and the reference voltage generation circuit 206 to the regions C, D, E, and F. Since the regions C and D and the regions E and F use different column DAC circuits, a characteristic difference derived from the difference of the column DAC circuit between the region D and the region E may occur. However, the above-described signal write period can be shortened.

Third Embodiment

A light emitting apparatus according to the third embodiment will be described with reference to FIGS. 7 and 8. Matters that are not mentioned in the third embodiment can comply with the first and second embodiments as far as they are not incompatible.

Figure 7:
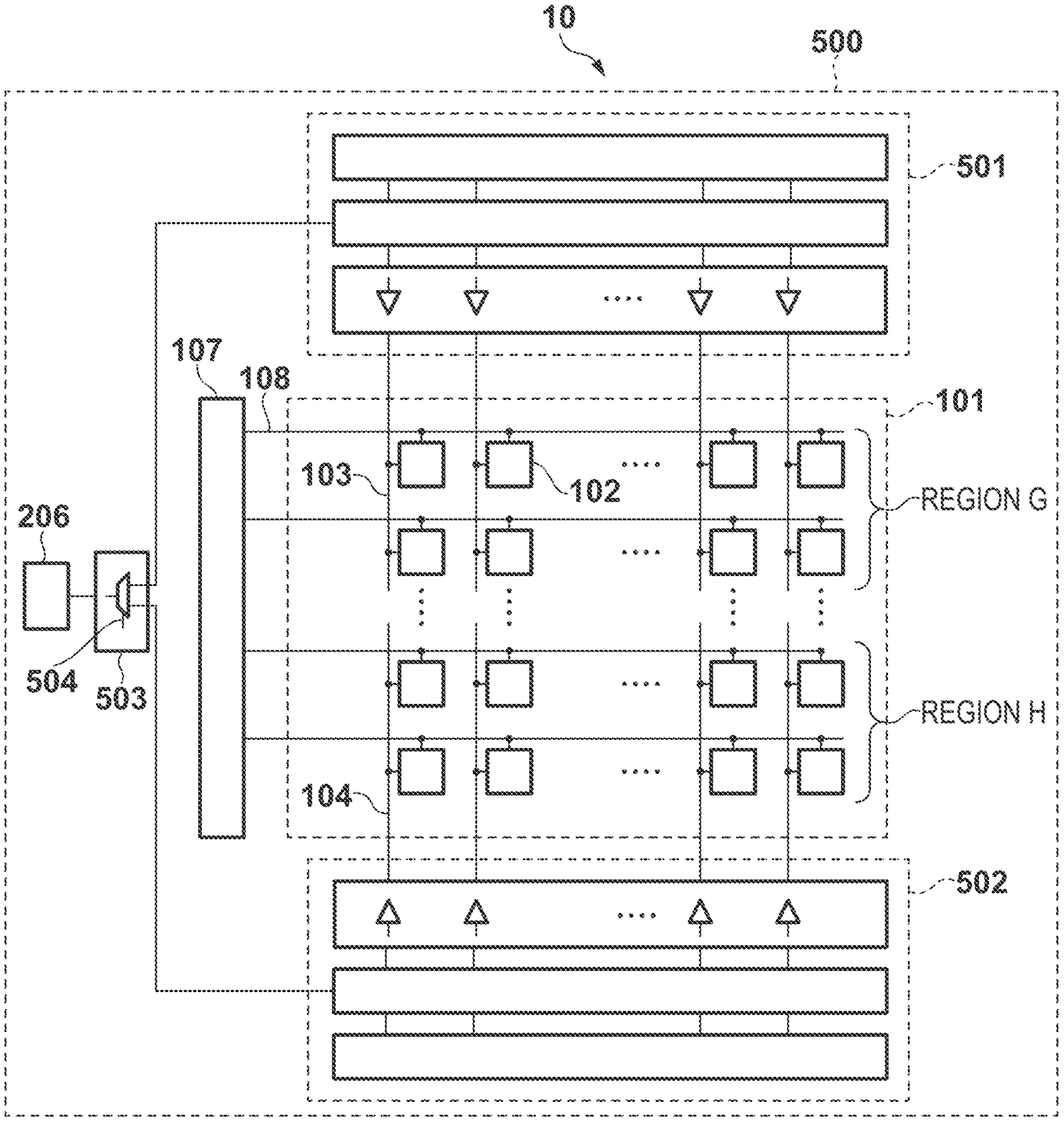
FIG. 7 is a view showing the configuration of a light emitting apparatus.

FIG. 7 is a view showing the configuration of a light emitting apparatus 10 according to the third embodiment. In the above-described first and second embodiments, the light emitting apparatus 10 includes the pixel substrate 100 (first substrate) and the circuit board 200 (second substrate), which are stacked on each other. However, the present invention is not limited to the configuration in which a plurality of substrates are stacked. In the third embodiment, a pixel array portion 101 and a signal output circuit 501 are formed on the same substrate 500, unlike the first embodiment. A plurality of signal lines extending in the column direction are divided into a plurality of first sub-signal lines 103 and a plurality of second sub-signal lines 104. Here, consider two regions obtained by dividing a region including a plurality of pixels 102 into two parts by a line parallel to the row direction. One of the two regions is defined as a region G (first region), and the other is defined as a region H (second region). The region G includes the plurality of first sub-signal lines 103, and the region H includes the plurality of second sub-signal lines 104. An image signal is input to each pixel in the region G via the sub-signal line 103, and an image signal is input to each pixel in the region H via the sub-signal line 104. The "sub-signal line" will simply be referred to as a "signal line" hereinafter.

The signal line 103 is connected to the signal output circuit 501, and the signal line 104 is connected to a signal output circuit 502. Each of the signal output circuits 501 and 502 can include a horizontal scanning circuit, a column DAC circuit, and a column driver circuit 204. The output of a reference voltage generation circuit 206 is input to the column DAC circuit of each of the signal output circuits 501 and 502 via a signal line switching circuit 503. The signal line switching circuit 503 is controlled by a switching control signal 504. For example, if the switching control signal 504 is at LOW, the signal line switching circuit 503 is connected to the signal output circuit 501 for the region G. If the switching control signal 504 is at HIGH, the signal line switching circuit 503 is connected to the signal output circuit 502 for the region H.

Figure 8:
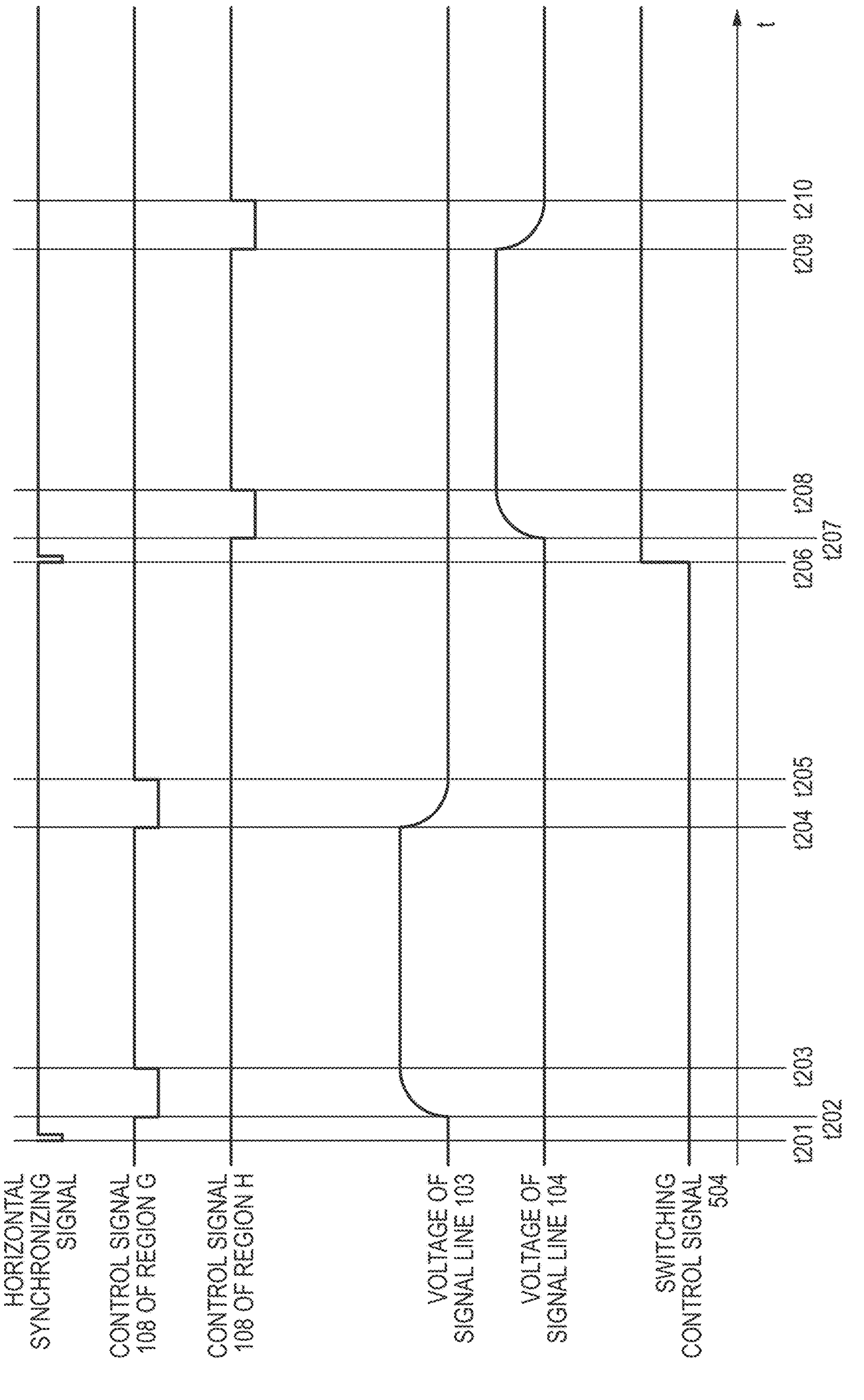
FIG. 8 is a timing chart showing an example of the operation of the light emitting apparatus.

FIG. 8 is a timing chart showing an example of the operation of the light emitting apparatus 10 according to this embodiment. In the first embodiment, the switching control signal 208 is used as the switching control signal, but in this embodiment, the switching control signal 504 is used. However, the timing relationship is the same in the timing charts of FIGS. 8 and 3.

As described above, in this embodiment, when supplying a signal to the pixels in the region G, the output of the reference voltage generation circuit 206 is input to the signal output circuit 501 via the signal line switching circuit 503. When supplying a signal to the pixels in the region H, the output of the reference voltage generation circuit 206 is input to the signal output circuit 502 via the signal line switching circuit 503. At this time, when scanning the pixels in the region G and the pixels in the region H, the signal is supplied from the same reference voltage generation circuit 206.

As described above, according to this embodiment, the characteristic difference of pixels can be reduced. Since the configuration of this embodiment is a configuration in which different column DAC circuits and column driver circuits are used for the pixels in the region G and the pixels in the region H, the characteristic difference suppressing effect may be small as compared to the first and second embodiments. However, even if a stacked structure that is generally said to have a cost demerit is not employed, as described above, a configuration in which a signal generated using the output signal from the same reference voltage generation circuit is supplied to the pixels of the same column via a corresponding signal line can be applied. Hence, even by this configuration, the characteristic difference of pixels between the regions can be reduced.

APPLICATION EXAMPLES

Hereinafter, application examples in which the light emitting apparatus 10 according to the above-described embodiments is applied to an image forming apparatus, a display apparatus, a photoelectric conversion apparatus, an electronic device, an illumination apparatus, a moving body, and a wearable device will be described. The description will be given assuming that, for example, an organic light emitting element such as an organic EL element is arranged as a light emitting element in each of the plurality of pixels 102 arranged in the pixel array portion 101 of the light emitting apparatus 10. Details of each component arranged in the pixel array portion 101 of the light emitting apparatus 10 described above will be described first, and the application examples will be described after that.

Configuration of Organic Light Emitting Element

The organic light emitting element is provided by forming an insulating layer, a first electrode, an organic compound layer, and a second electrode on a substrate. A protection layer, a color filter, a microlens, and the like may be provided on a cathode. If a color filter is provided, a planarizing layer may be provided between the protection layer and the color filter. The planarizing layer can be formed using acrylic resin or the like. The same applies to a case where a planarizing layer is provided between the color filter and the microlens.

Substrate

Quartz, glass, a silicon wafer, a resin, a metal, or the like may be used as a substrate. Furthermore, a switching element such as a transistor, a wiring pattern, and the like may be provided on the substrate, and an insulating layer may be provided thereon. The insulating layer may be made of any material as long as a contact hole can be formed so that the wiring pattern can be formed between the first electrode and the substrate and insulation from the unconnected wiring pattern can be ensured. For example, a resin such as polyimide, silicon oxide, silicon nitride, or the like may be used for the insulating layer.

Electrode

A pair of electrodes can be used as the electrodes. The pair of electrodes can be an anode and a cathode. If an electric field is applied in the direction in which the organic light emitting element emits light, the electrode having a high potential is the anode, and the other is the cathode. It can also be said that the electrode that supplies holes to the light emitting layer is the anode and the electrode that supplies electrons is the cathode.

As the constituent material of the anode, a material having a large work function may be selected. For example, a metal such as gold, platinum, silver, copper, nickel, palladium, cobalt, selenium, vanadium, or tungsten, a mixture containing some of them, or an alloy obtained by combining these can be used as the constituent material of the anode. Alternatively, a metal oxide such as tin oxide, zinc oxide, indium oxide, indium tin oxide (ITO), or zinc indium oxide can be used as the constituent material of the anode. Alternatively, a conductive polymer such as polyaniline, polypyrrole, or polythiophene may be used as the constituent material of the anode.

One of these electrode materials may be used singly, or two or more of them may be used in combination. The anode may be formed by a single layer or a plurality of layers.

If the electrode is used as a reflective electrode, for example, chromium, aluminum, silver, titanium, tungsten, molybdenum, an alloy thereof, a stacked layer thereof, or the like can be used. The above materials can function as a reflective film having no role as an electrode. If a transparent electrode is used as the electrode, an oxide transparent conductive layer made of indium tin oxide (ITO), indium zinc oxide, or the like can be used, but the present invention is not limited thereto. A photolithography technique can be used to form the electrode.

On the other hand, as the constituent material of the cathode, a material having a small work function may be selected. Examples of the material include an alkali metal such as lithium, an alkaline earth metal such as calcium, a metal such as aluminum, titanium, manganese, silver, lead, or chromium, and a mixture containing some of them. Alternatively, an alloy obtained by combining these metals can also be used. For example, a magnesium-silver alloy, an aluminum-lithium alloy, an aluminum-magnesium alloy, a silver-copper alloy, a zinc-silver alloy, or the like can be used. A metal oxide such as indium tin oxide (ITO) can also be used. One of these electrode materials may be used singly, or two or more of them may be used in combination. The cathode may have a single-layer structure or a multilayer structure. Silver may be used as the cathode. To suppress aggregation of silver, a silver alloy may be used. The ratio of the alloy is not limited as long as aggregation of silver can be suppressed. For example, the ratio between silver and another metal may be 1:1, 3:1, or the like.

The cathode may be a top emission element using an oxide conductive layer made of ITO or the like, or may be a bottom emission element using a reflective electrode made of aluminum (Al) or the like, and is not particularly limited. The method of forming the cathode is not particularly limited, but if direct current sputtering or alternating current sputtering is used, the good coverage is achieved for the film to be formed, and the resistance of the cathode can be lowered.

Pixel Isolation Layer

A pixel isolation layer may be formed by a so-called silicon oxide, such as silicon nitride (SiN), silicon oxynitride (SiON), or silicon oxide (SiO), formed using a Chemical Vapor Deposition (CVD) method. To increase the resistance in the in-plane direction of the organic compound layer, the organic compound layer, especially the hole transport layer may be thinly deposited on the side wall of the pixel isolation layer. More specifically, the organic compound layer can be deposited so as to have a thin film thickness on the side wall by increasing the taper angle of the side wall of the pixel isolation layer or the film thickness of the pixel isolation layer to increase vignetting during vapor deposition.

On the other hand, the taper angle of the side wall of the pixel isolation layer or the film thickness of the pixel isolation layer can be adjusted to the extent that no space is formed in the protection layer formed on the pixel isolation layer. Since no space is formed in the protection layer, it is possible to reduce generation of defects in the protection layer. Since generation of defects in the protection layer is reduced, a decrease in reliability caused by generation of a dark spot or occurrence of a conductive failure of the second electrode can be reduced.

According to this embodiment, even if the taper angle of the side wall of the pixel isolation layer is not acute, it is possible to effectively suppress leakage of charges to an adjacent pixel. As a result of this consideration, it has been found that the taper angle of 60° (inclusive) to 90° (inclusive) can sufficiently reduce the occurrence of defects. The film thickness of the pixel isolation layer may be 10 nm (inclusive) to 150 nm (inclusive). A similar effect can be obtained in a configuration including only pixel electrodes without the pixel isolation layer. However, in this case, the film thickness of the pixel electrode is set to be equal to or smaller than half the film thickness of the organic layer or the end portion of the pixel electrode is formed to have a forward tapered shape of less than 60°. With this, short circuit of the organic light emitting element can be reduced.

Furthermore, in a case where the first electrode is the cathode and the second electrode is the anode, a high color gamut and low-voltage driving can be achieved by forming the electron transport material and charge transport layer and forming the light emitting layer on the charge transport layer.

Organic Compound Layer

The organic compound layer may be formed by a single layer or a plurality of layers. If the organic compound layer includes a plurality of layers, the layers can be called a hole injection layer, a hole transport layer, an electron blocking layer, a light emitting layer, a hole blocking layer, an electron transport layer, and an electron injection layer in accordance with the functions of the layers. The organic compound layer is mainly formed from an organic compound but may contain inorganic atoms and an inorganic compound. For example, the organic compound layer may contain copper, lithium, magnesium, aluminum, iridium, platinum, molybdenum, zinc, or the like. The organic compound layer may be arranged between the first and second electrodes, and may be arranged in contact with the first and second electrodes.

Protection Layer

A protection layer may be provided on the cathode. For example, by adhering glass provided with a moisture absorbing agent on the cathode, permeation of water or the like into the organic compound layer can be suppressed and occurrence of display defects can be suppressed. Furthermore, as another embodiment, a passivation layer made of silicon nitride or the like may be provided on the cathode to suppress permeation of water or the like into the organic compound layer. For example, the protection layer can be formed by forming the cathode, transferring it to another chamber without breaking the vacuum, and forming silicon nitride having a thickness of 2 μm by the CVD method. The protection layer may be provided using an atomic layer deposition (ALD) method after deposition of the protection layer using the CVD method. The material of the protection layer by the ALD method is not limited but can be silicon nitride, silicon oxide, aluminum oxide, or the like. Silicon nitride may further be formed by the CVD method on the protection layer formed by the ALD method. The protection layer formed by the ALD method may have a film thickness smaller than that of the protection layer formed by the CVD method. More specifically, the film thickness of the protection layer formed by the ALD method may be 50% or less, or 10% or less of that of the protection layer formed by the CVD method.

Color Filter

A color filter may be provided on the protection layer. For example, a color filter considering the size of the organic light emitting element may be provided on another substrate, and the substrate with the color filter formed thereon may be bonded to the substrate with the organic light emitting element provided thereon. Alternatively, for example, a color filter may be patterned on the above-described protection layer using a photolithography technique. The color filter may be formed from a polymeric material.

Planarizing Layer

A planarizing layer may be arranged between the color filter and the protection layer. The planarizing layer is provided to reduce unevenness of the layer below the planarizing layer. The planarizing layer may be called a material resin layer without limiting the purpose of the layer. The planarizing layer may be formed from an organic compound, and may be made of a low-molecular material or a polymeric material. In consideration of reduction of unevenness, a polymeric organic compound may be used for the planarizing layer.

The planarizing layers may be provided above and below the color filter. In that case, the same or different constituent materials may be used for these planarizing layers. More specifically, examples of the material of the planarizing layer include polyvinyl carbazole resin, polycarbonate resin, polyester resin, ABS resin, acrylic resin, polyimide resin, phenol resin, epoxy resin, silicone resin, and urea resin.

Microlens

The organic light emitting apparatus may include an optical member such as a microlens on the light emission side. The microlens can be made of acrylic resin, epoxy resin, or the like. The microlens can aim to increase the amount of light extracted from the organic light emitting apparatus and control the direction of light to be extracted. The microlens can have a hemispherical shape. If the microlens has a hemispherical shape, among tangents contacting the hemisphere, there is a tangent parallel to the insulating layer, and the contact between the tangent and the hemisphere is the vertex of the microlens. The vertex of the microlens can be decided in the same manner even in an arbitrary sectional view. That is, among tangents contacting the semicircle of the microlens in a sectional view, there is a tangent parallel to the insulating layer, and the contact between the tangent and the semicircle is the vertex of the microlens.

Furthermore, the middle point of the microlens can also be defined. In the section of the microlens, a line segment from a point at which an arc shape ends to a point at which another arc shape ends is assumed, and the middle point of the line segment can be called the middle point of the microlens. A section for determining the vertex and the middle point may be a section perpendicular to the insulating layer.

The microlens includes a first surface including a convex portion and a second surface opposite to the first surface. The second surface can be arranged on the functional layer (light emitting layer) side of the first surface. For this configuration, the microlens needs to be formed on the light emitting apparatus. If the functional layer is an organic layer, a process which produces high temperature in the manufacturing step of the microlens may be avoided. In addition, if it is configured to arrange the second surface on the functional layer side of the first surface, all the glass transition temperatures of an organic compound forming the organic layer may be 100° C. or more. For example, 130° C. or more is suitable.

Counter Substrate

A counter substrate may be arranged on the planarizing layer. The counter substrate is called a counter substrate because it is provided at a position corresponding to the above-described substrate. The constituent material of the counter substrate can be the same as that of the above-described substrate. If the above-described substrate is the first substrate, the counter substrate can be the second substrate.

Organic Layer

The organic compound layer (hole injection layer, hole transport layer, electron blocking layer, light emitting layer, hole blocking layer, electron transport layer, electron injection layer, and the like) forming the organic light emitting element according to an embodiment of the present disclosure may be formed by the method to be described below.

The organic compound layer forming the organic light emitting element according to the embodiment of the present disclosure can be formed by a dry process using a vacuum deposition method, an ionization deposition method, a sputtering method, a plasma method, or the like. Instead of the dry process, a wet process that forms a layer by dissolving a solute in an appropriate solvent and using a well-known coating method (for example, a spin coating method, a dipping method, a casting method, an LB method, an inkjet method, or the like) can be used.

Here, when the layer is formed by a vacuum deposition method, a solution coating method, or the like, crystallization or the like hardly occurs and excellent temporal stability is obtained. Furthermore, when the layer is formed using a coating method, it is possible to form the film in combination with a suitable binder resin.

Examples of the binder resin include polyvinyl carbazole resin, polycarbonate resin, polyester resin, ABS resin, acrylic resin, polyimide resin, phenol resin, epoxy resin, silicone resin, and urea resin. However, the binder resin is not limited to them.

One of these binder resins may be used singly as a homopolymer or a copolymer, or two or more of them may be used in combination. Furthermore, additives such as a well-known plasticizer, antioxidant, and an ultraviolet absorber may also be used as needed.

Pixel Circuit

The light emitting apparatus can include a pixel circuit connected to the light emitting element. The pixel circuit may be an active matrix circuit that individually controls light emission of the first and second light emitting elements. The active matrix circuit may be a voltage or current programing circuit. A driving circuit includes a pixel circuit for each pixel. The pixel circuit can include a light emitting element, a transistor for controlling light emission luminance of the light emitting element, a transistor for controlling a light emission timing, a capacitor for holding the gate voltage of the transistor for controlling the light emission luminance, and a transistor for connection to GND without intervention of the light emitting element.

The light emitting apparatus includes a display region and a peripheral region arranged around the display region. The light emitting apparatus includes the pixel circuit in the display region and a display control circuit in the peripheral region. The mobility of the transistor forming the pixel circuit may be smaller than that of a transistor forming the display control circuit.

The slope of the current-voltage characteristic of the transistor forming the pixel circuit may be smaller than that of the current-voltage characteristic of the transistor forming the display control circuit. The slope of the current-voltage characteristic can be measured by a so-called Vg-Ig characteristic.

The transistor forming the pixel circuit is a transistor connected to the light emitting element such as the first light emitting element.

Pixel

The organic light emitting apparatus includes a plurality of pixels. Each pixel includes sub-pixels that emit light components of different colors. The sub-pixels may include, for example, R, G, and B emission colors, respectively.

In each pixel, a region also called a pixel opening emits light. The pixel opening can have a size of 5 μm (inclusive) to 15 μm (inclusive). More specifically, the pixel opening can have a size of 11 μm, 9.5 μm, 7.4 μm, 6.4 μm, or the like.

A distance between the sub-pixels can be 10 μm or less, and can be, more specifically, 8 μm, 7.4 μm, or 6.4 μm.

The pixels can have a known arrangement form in a plan view. For example, the pixels may have a stripe arrangement, a delta arrangement, a pentile arrangement, or a Bayer arrangement. The shape of each sub-pixel in a plan view may be any known shape. For example, a quadrangle such as a rectangle or a rhombus, a hexagon, or the like may be possible. A shape which is not a correct shape but is close to a rectangle is included in a rectangle, as a matter of course. The shape of the sub-pixel and the pixel arrangement can be used in combination.

Application of Organic Light Emitting Element of Embodiment of Present Disclosure The organic light emitting element according to an embodiment of the present disclosure can be used as a constituent member of a display apparatus or an illumination apparatus. In addition, the organic light emitting element is applicable to the exposure light source of an electrophotographic image forming apparatus, the backlight of a liquid crystal display apparatus, a light emitting apparatus including a color filter in a white light source, and the like.

The display apparatus may be an image information processing apparatus that includes an image input unit for inputting image information from an area CCD, a linear CCD, a memory card, or the like, and an information processing unit for processing the input information, and displays the input image on a display unit.

In addition, a display unit included in an image capturing apparatus or an inkjet printer can have a touch panel function. The driving type of the touch panel function may be an infrared type, a capacitance type, a resistive film type, or an electromagnetic induction type, and is not particularly limited. The display apparatus may be used for the display unit of a multifunction printer.

Figure 10A:
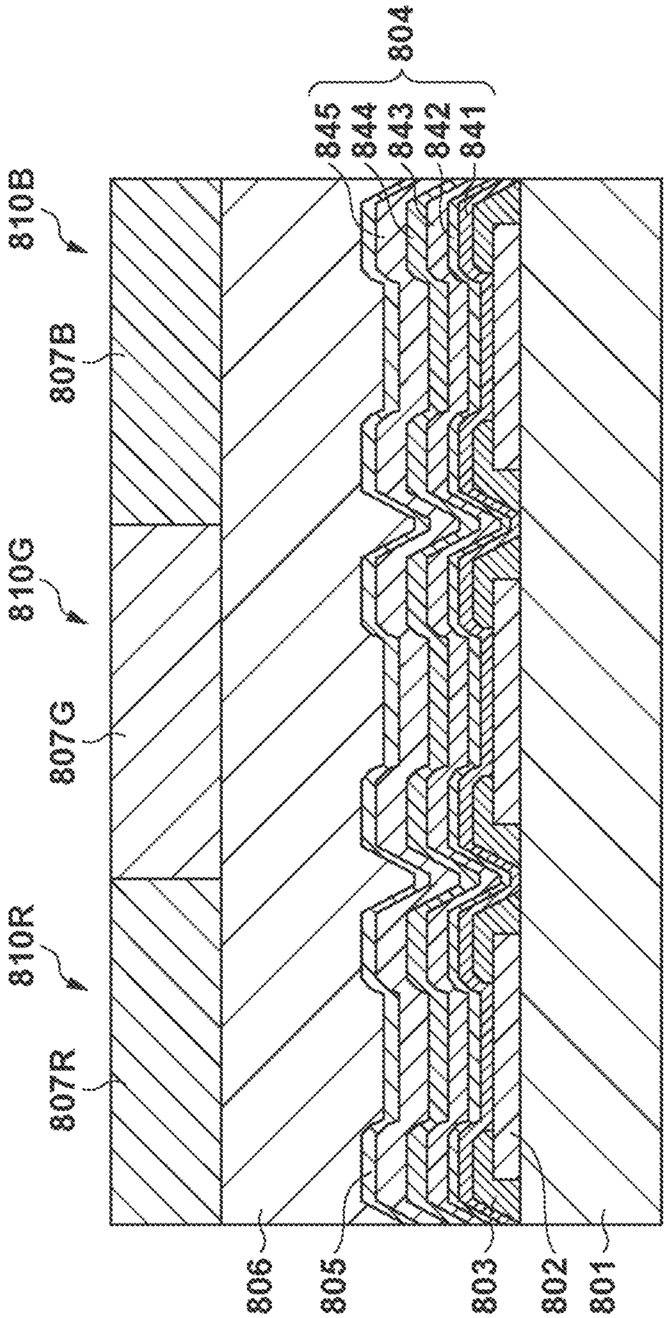
FIGS. 10A and 10B are sectional views showing an example of the configuration of a pixel of the light emitting apparatus.

More details will be described next with reference to the accompanying drawings. FIG. 10A shows an example of a pixel that is a constituent element of the above-described pixel array portion 101. The pixel includes sub-pixels 810. The sub-pixels are divided into sub-pixels 810R, 810G, and 810B by emitted light components. The light emission colors may be discriminated by the wavelengths of light components emitted from the light emitting layers, or light emitted from each sub-pixel may be selectively transmitted or undergo color conversion by a color filter or the like. Each sub-pixel includes a reflective electrode 802 as the first electrode on an interlayer insulating layer 801, an insulating layer 803 covering the end of the reflective electrode 802, an organic compound layer 804 covering the first electrode and the insulating layer, a transparent electrode 805 as the second electrode, a protection layer 806, and a color filter 807.

The interlayer insulating layer 801 can include a transistor and a capacitive element arranged in the interlayer insulating layer 801 or a layer below it. The transistor and the first electrode can electrically be connected via a contact hole (not shown) or the like.

The insulating layer 803 can also be called a bank or a pixel isolation film. The insulating layer 803 covers the end of the first electrode, and is arranged to surround the first electrode. A portion of the first electrode where no insulating layer 803 is arranged is in contact with the organic compound layer 804 to form a light emitting region.

The organic compound layer 804 includes a hole injection layer 841, a hole transport layer 842, a first light emitting layer 843, a second light emitting layer 844, and an electron transport layer 845.

The second electrode may be a transparent electrode, a reflective electrode, or a semi-transmissive electrode.

The protection layer 806 suppresses permeation of water into the organic compound layer. The protection layer is shown as a single layer but may include a plurality of layers. Each layer can be an inorganic compound layer or an organic compound layer.

The color filter 807 is divided into color filters 807R, 807G, and 807B by colors. The color filters can be formed on a planarizing film (not shown). A resin protection layer (not shown) may be arranged on the color filters. The color filters can be formed on the protection layer 806. Alternatively, the color filters can be provided on the counter substrate such as a glass substrate, and then the substrate may be bonded.

Figure 10B:
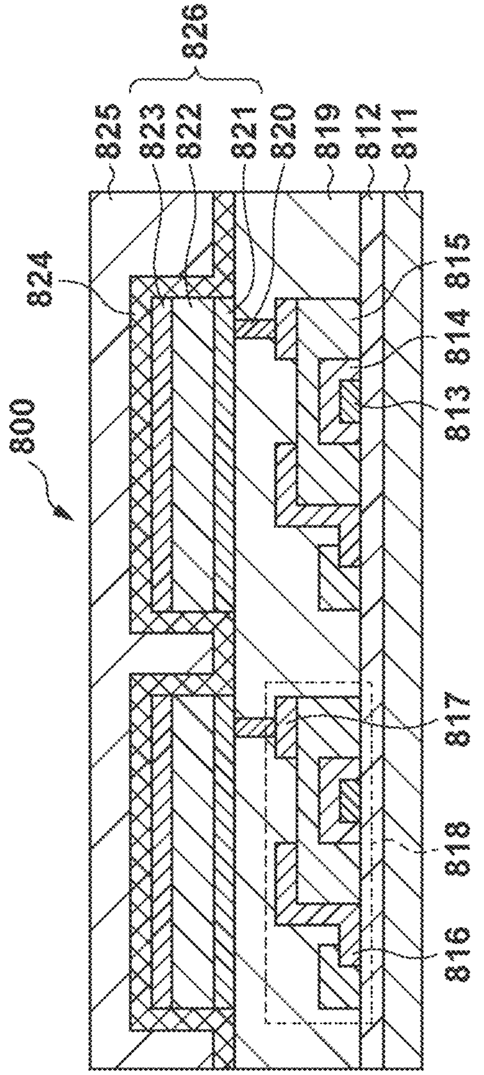

A display apparatus 800 (corresponding to the above-described light emitting apparatus 10) shown in FIG. 10B can include an organic light emitting element 826 and a TFT 818 as an example of a transistor. An insulating layer 812 is provided on a substrate 811 of glass, silicon, or the like. The active element such as the TFT 818 is arranged on the insulating layer 812, and a gate electrode 813, a gate insulating film 814, and a semiconductor layer 815 of the active element are arranged. The TFT 818 can further include the semiconductor layer 815, a drain electrode 816, and a source electrode 817. An insulating film 819 is provided on the TFT 818. The source electrode 817 and an anode 821 forming the organic light emitting element 826 are connected via a contact hole 820 formed in the insulating film 819.

A method of electrically connecting the electrodes (anode and cathode) included in the organic light emitting element 826 and the electrodes (source electrode and drain electrode) included in the TFT is not limited to that shown in FIG. 10B. That is, one of the anode and cathode and one of the source electrode and drain electrode of the TFT are electrically connected. The TFT indicates a thin-film transistor.

In the display apparatus 800 shown in FIG. 10B, an organic compound layer is illustrated as one layer. However, an organic compound layer 822 may include a plurality of layers. A first protection layer 824 and a second protection layer 825 are provided on a cathode 823 to suppress deterioration of the organic light emitting element.

A transistor is used as a switching element in the display apparatus 800 shown in FIG. 10B but may be used as another switching element.

The transistor used in the display apparatus 800 shown in FIG. 10B is not limited to a transistor using a single-crystal silicon wafer, and may be a thin-film transistor including an active layer on an insulating surface of a substrate. Examples of the active layer include single-crystal silicon, amorphous silicon, non-single-crystal silicon such as microcrystalline silicon, and a non-single-crystal oxide semiconductor such as indium zinc oxide and indium gallium zinc oxide. Note that a thin-film transistor is also called a TFT element.

The transistor included in the display apparatus 800 shown in FIG. 10B may be formed in the substrate such as a silicon substrate. Forming the transistor in the substrate means forming the transistor by processing the substrate such as a silicon substrate. That is, when the transistor is included in the substrate, it can be considered that the substrate and the transistor are formed integrally.

The light emission luminance of the organic light emitting element according to this embodiment can be controlled by the TFT which is an example of a switching element, and the plurality of organic light emitting elements can be provided in a plane to display an image with the light emission luminances of the respective elements. Here, the switching element according to this embodiment is not limited to the TFT, and may be a transistor formed from low-temperature polysilicon or an active matrix driver formed on the substrate such as a silicon substrate. The term "on the substrate" may mean "in the substrate". Whether to provide a transistor in the substrate or use a TFT is selected based on the size of the display unit. For example, if the size is about 0.5 inch, the organic light emitting element is preferably provided on the silicon substrate.

Figure 11A:
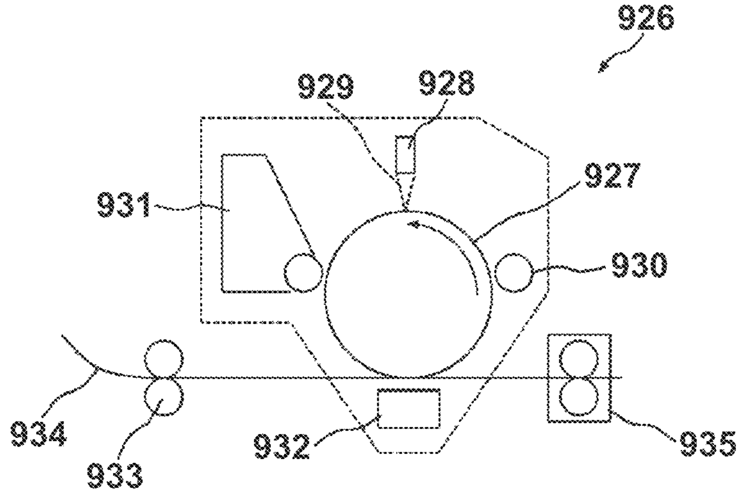
FIGS. 11A to 11C are views showing an example of the configuration of an image forming apparatus.
Figure 11B:
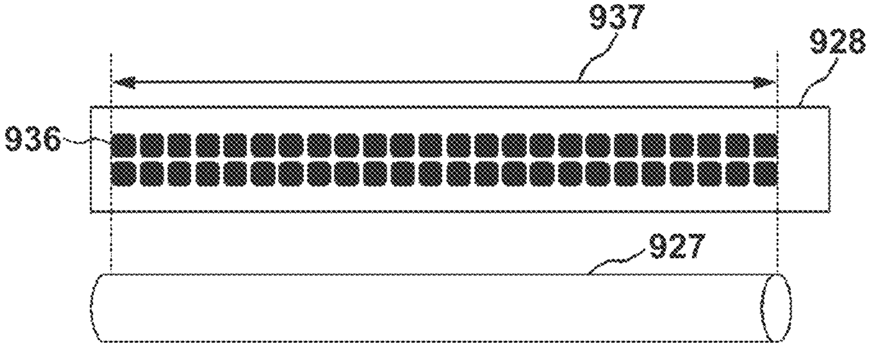
Figure 11C:
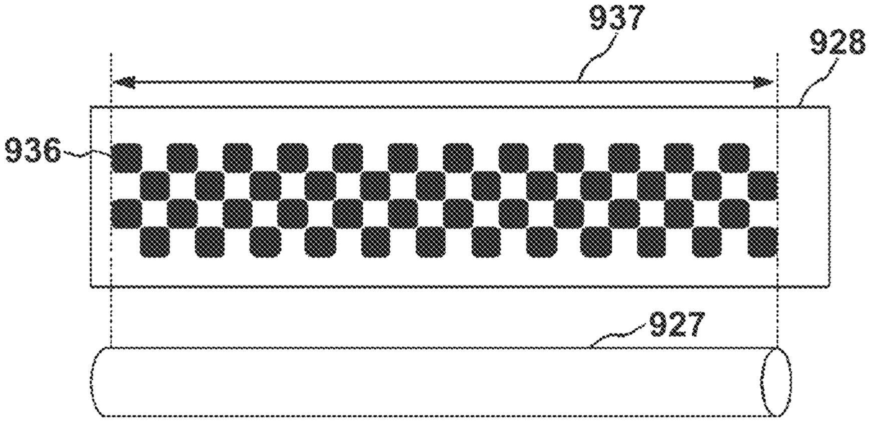

FIGS. 11A to 11C are schematic views showing an example of an image forming apparatus using the above-described light emitting apparatus 10. An image forming apparatus 926 shown in FIG. 11A includes a photosensitive member 927, an exposure light source 928, a developing unit 931, a charging unit 930, a transfer device 932, a conveyance unit 933 (a conveyance roller in the configuration shown in FIG. 11A), and a fixing device 935.

Light 929 is emitted from the exposure light source 928, and an electrostatic latent image is formed on the surface of the photosensitive member 927. The light emitting apparatus 10 can be applied to the exposure light source 928. The developing unit 931 can function as a developing device that includes a toner or the like as a developing agent and applies the developing agent to the exposed photosensitive member 927. The charging unit 930 charges the photosensitive member 927. The transfer device 932 transfers the developed image to a print medium 934. The conveyance unit 933 conveys the print medium 934. The print medium 934 can be, for example, paper, a film, or the like. The fixing device 935 fixes the image formed on the print medium.

Each of FIGS. 11B and 11C is a schematic view showing a form in which a plurality of light emitting units 936 are arranged in the exposure light source 928 along the longitudinal direction of a long substrate. The light emitting apparatus 10 can be applied to each of the light emitting units 936. That is, a plurality of pixels 150 arranged in a pixel array 110 are arranged along the longitudinal direction of the substrate. A direction 937 is a direction parallel to the axis of the photosensitive member 927. This column direction matches the direction of the axis upon rotating the photosensitive member 927. This direction 937 can also be referred to as the long-axis direction of the photosensitive member 927.

FIG. 11B shows a form in which the light emitting units 936 are arranged along the long-axis direction of the photosensitive member 927. FIG. 11C shows a form, which is a modification of the arrangement of the light emitting units 936 shown in FIG. 11B. FIG. 11C shows a form in which the light emitting units 936 are arranged in the column direction alternately between the first column and the second column. The light emitting units 936 are arranged at different positions in the row direction between the first column and the second column. In the first column, the plurality of light emitting units 936 are arranged apart from each other. In the second column, the light emitting unit 936 is arranged at the position corresponding to the space between the light emitting units 936 in the first column. Furthermore, in the row direction, the plurality of light emitting units 936 are arranged apart from each other. The arrangement of the light emitting units 936 shown in FIG. 11C can be referred to as, for example, an arrangement in a grid pattern, an arrangement in a staggered pattern, or an arrangement in a checkered pattern.

Figure 12:
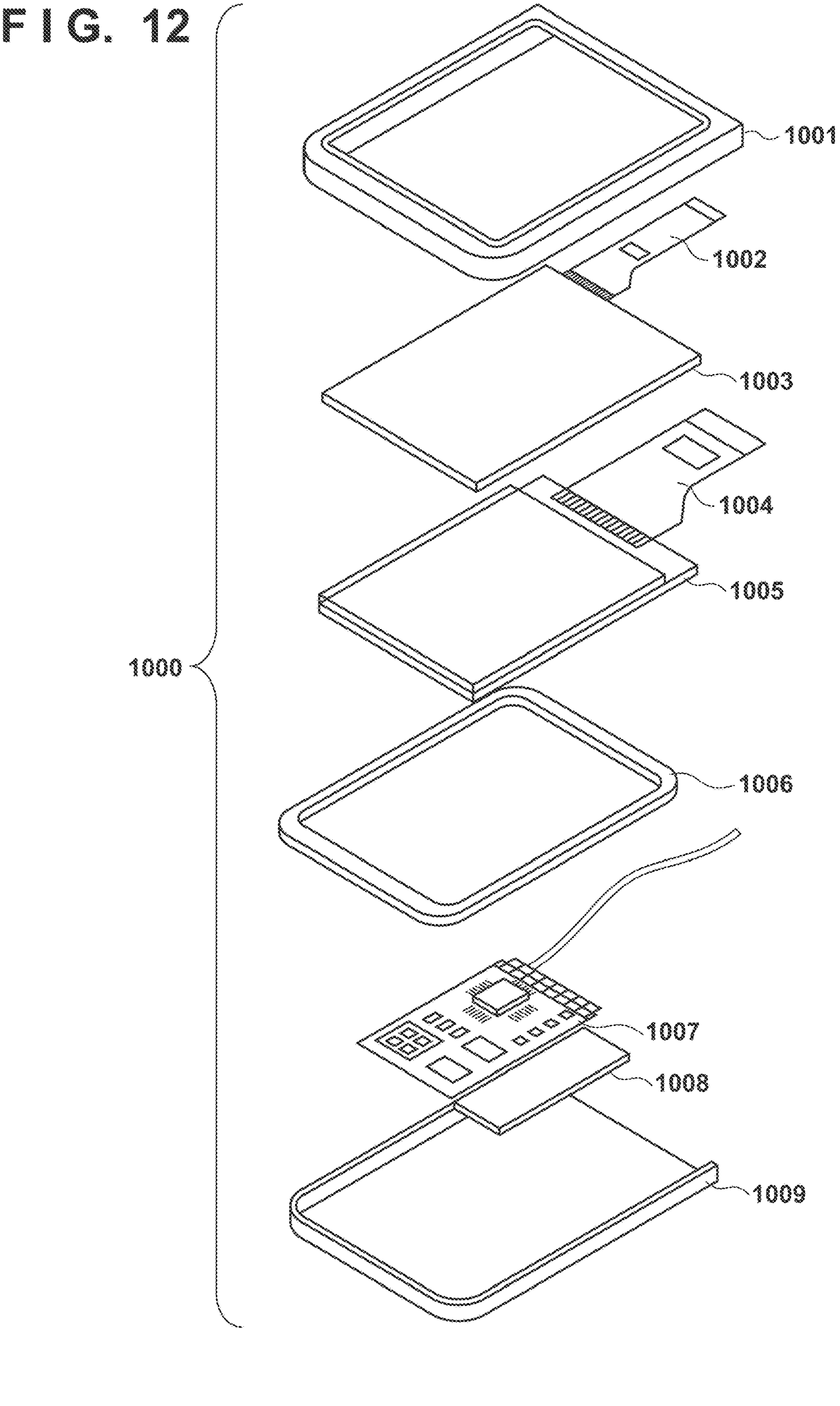
FIG. 12 is a view showing an example of the configuration of a display apparatus.

FIG. 12 is a schematic view showing an example of the display apparatus using the above-described light emitting apparatus 10. A display apparatus 1000 can include a touch panel 1003, a display panel 1005, a frame 1006, a circuit board 1007, and a battery 1008 between an upper cover 1001 and a lower cover 1009. Flexible printed circuits (FPCs) 1002 and 1004 are respectively connected to the touch panel 1003 and the display panel 1005. Active elements such as transistors are arranged on the circuit board 1007. The battery 1008 is unnecessary if the display apparatus 1000 is not a portable device. Even when the display apparatus 1000 is a portable device, the battery 1008 need not be provided at this position. The light emitting apparatus 10 can be applied to the display panel 1005. The pixels 150 arranged in the pixel array portion 101 of the light emitting apparatus 10 functioning as the display panel 1005 operate in a state in which they are connected to the active elements such as transistors arranged on the circuit board 1007.

The display apparatus 1000 shown in FIG. 12 can be used for a display unit of a photoelectric conversion apparatus (also referred to as an image capturing apparatus) including an optical unit having a plurality of lenses, and an image sensor for receiving light having passed through the optical unit and photoelectrically converting the light into an electric signal. The photoelectric conversion apparatus can include a display unit for displaying information acquired by the image sensor. In addition, the display unit can be either a display unit exposed outside the photoelectric conversion apparatus, or a display unit arranged in the finder. The photoelectric conversion apparatus can be a digital camera or a digital video camera.

Figure 13:
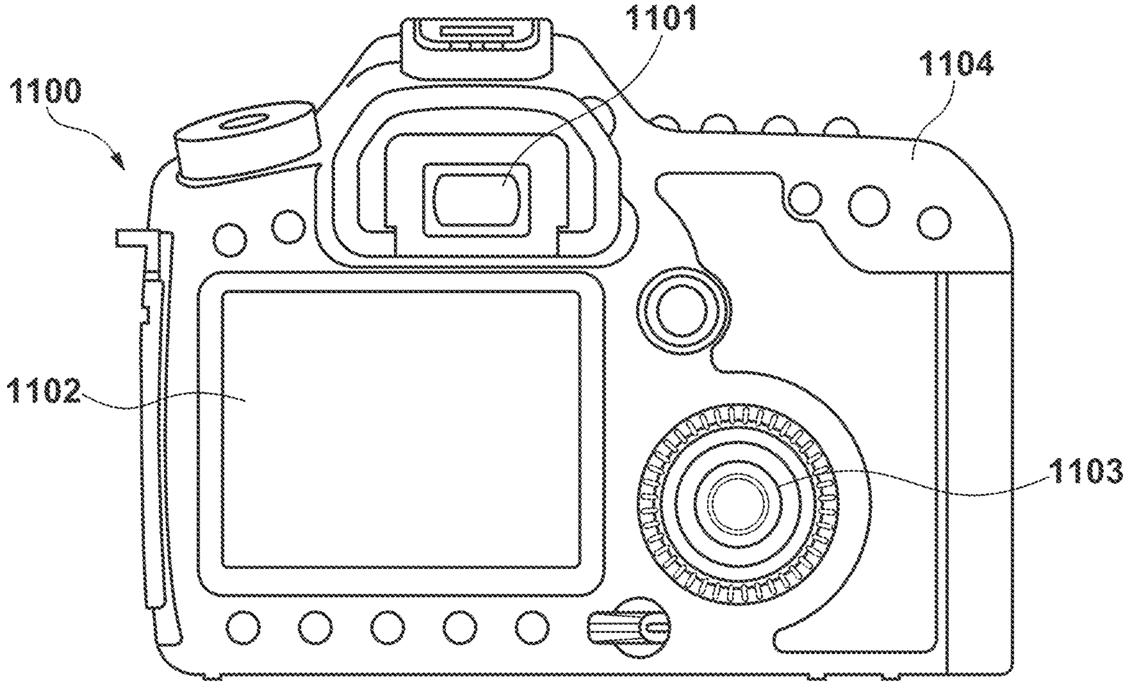
FIG. 13 is a view showing an example of a photoelectric conversion apparatus.

FIG. 13 is a schematic view showing an example of a photoelectric conversion apparatus 1100 using the above-described light emitting apparatus 10. The photoelectric conversion apparatus 1100 can include a viewfinder 1101, a rear display 1102, an operation unit 1103, and a housing 1104. The photoelectric conversion apparatus 1100 can also be called an image capturing apparatus. The light emitting apparatus 10 according to this embodiment can be applied to the viewfinder 1101 or the rear display 1102 as a display unit. In this case, the pixel array portion 101 of the light emitting apparatus 10 can display not only an image to be captured but also environment information, image capturing instructions, and the like. Examples of the environment information are the intensity and direction of external light, the moving velocity of an object, and the possibility that an object is covered with an obstacle.

The timing suitable for image capturing is a very short time in many cases, so the information is preferably displayed as soon as possible. Therefore, the light emitting apparatus 10 in which the pixels 150 each including the light emitting element using the organic light emitting material such as an organic EL element are arranged in the pixel array portion 101 may be used for the viewfinder 1101 or the rear display 1102. This is so because the organic light emitting material has a high response speed. The light emitting apparatus 10 using the organic light emitting material can be used for the apparatuses that require a high display speed more preferably than for the liquid crystal display apparatus.

The photoelectric conversion apparatus 1100 includes an optical unit (not shown). This optical unit has a plurality of lenses, and forms an image on a photoelectric conversion element (not shown) that receives light having passed through the optical unit and is accommodated in the housing 1104. The focal points of the plurality of lenses can be adjusted by adjusting the relative positions. This operation can also automatically be performed.

The light emitting apparatus 10 may be applied to a display unit of an electronic device. At this time, the display unit can have both a display function and an operation function. Examples of the portable terminal are a portable phone such as a smartphone, a tablet, and a head mounted display.

Figure 14:
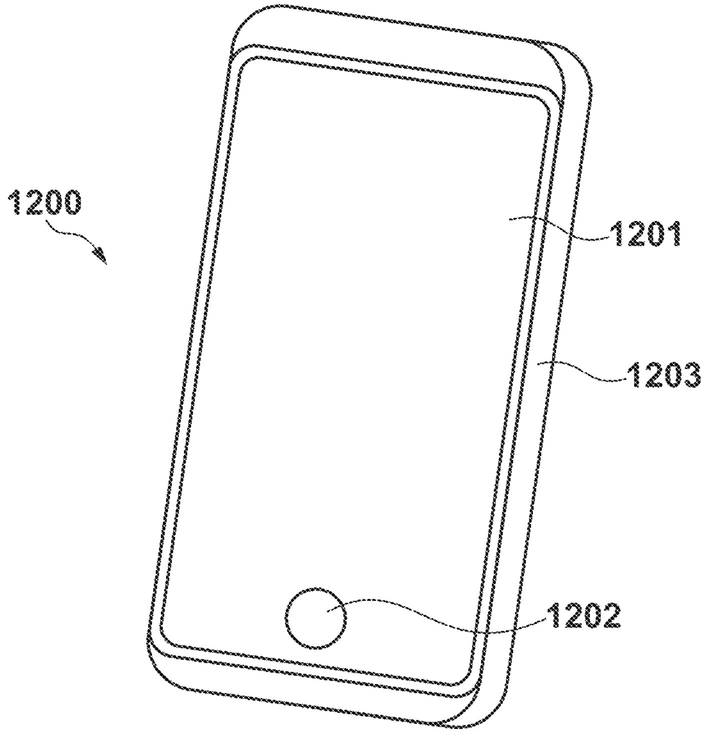
FIG. 14 is a view showing an example of an electronic device.

FIG. 14 is a schematic view showing an example of an electronic device 1200 using the above-described light emitting apparatus 10. The electronic device 1200 includes a display unit 1201, an operation unit 1202, and a housing 1203. The housing 1203 can accommodate a circuit, a printed board having this circuit, a battery, and a communication unit. The operation unit 1202 can be a button or a touch-panel-type reaction unit. The operation unit 1202 can also be a biometric authentication unit that performs unlocking or the like by authenticating the fingerprint. The portable device including the communication unit can also be regarded as a communication device. The light emitting apparatus 10 can be applied to the display unit 1201.

Figure 15A:
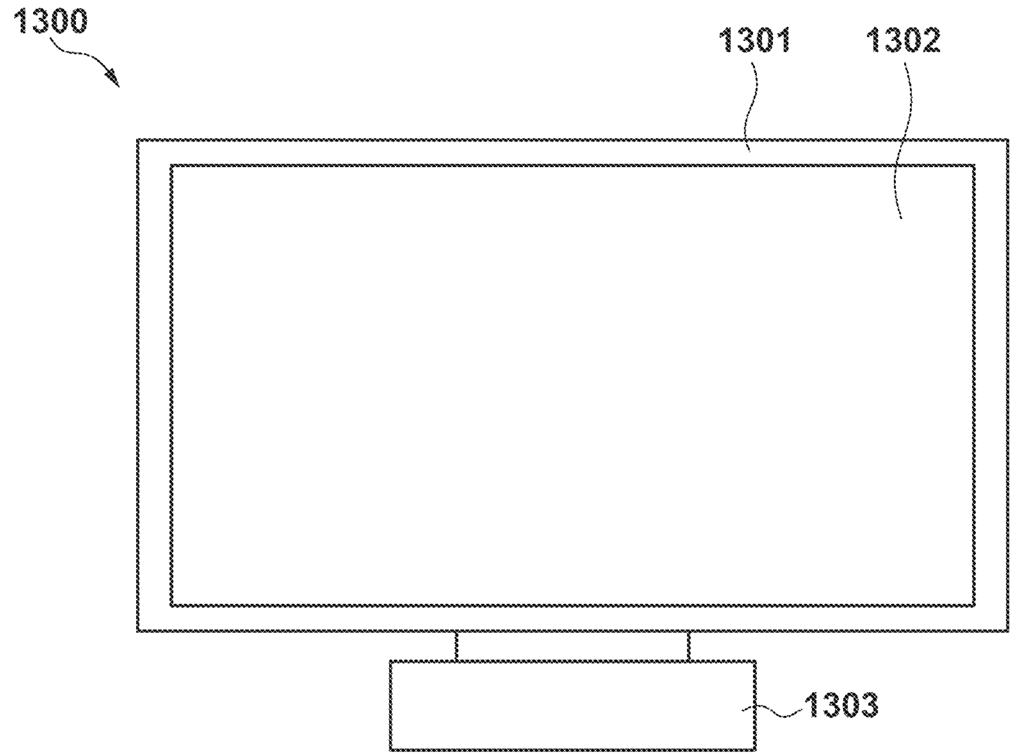
FIGS. 15A and 15B are views each showing an example of a display apparatus.
Figure 15B:
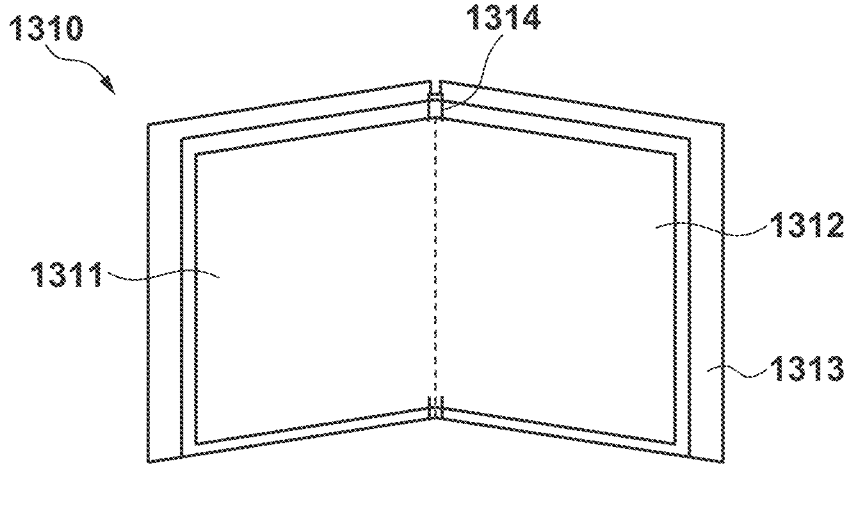

FIGS. 15A and 15B are schematic views showing examples of a display apparatus 1300 using the above-described light emitting apparatus 10. FIG. 15A shows a display apparatus such as a television monitor or a PC monitor. A display apparatus 1300 includes a frame 1301 and a display unit 1302. The light emitting apparatus 10 can be applied to the display unit 1302. The display apparatus 1300 can include a base 1303 that supports the frame 1301 and the display unit 1302. The base 1303 is not limited to the form shown in FIG. 15A. For example, the lower side of the frame 1301 may also function as the base 1303. In addition, the frame 1301 and the display unit 1302 can be bent. The radius of curvature in this case can be 5,000 mm (inclusive) to 6,000 mm (inclusive).

FIG. 15B is a schematic view showing another example of the display apparatus using the above-described light emitting apparatus 10. A display apparatus 1310 shown in FIG. 15B can be folded, and is a so-called foldable display apparatus. The display apparatus 1310 includes a first display unit 1311, a second display unit 1312, a housing 1313, and a bending point 1314. The light emitting apparatus 10 can be applied to each of the first display unit 1311 and the second display unit 1312. The first display unit 1311 and the second display unit 1312 can also be one seamless display apparatus. The first display unit 1311 and the second display unit 1312 can be divided by the bending point. The first display unit 1311 and the second display unit 1312 can display different images, and can also display one image together.

Figure 16:
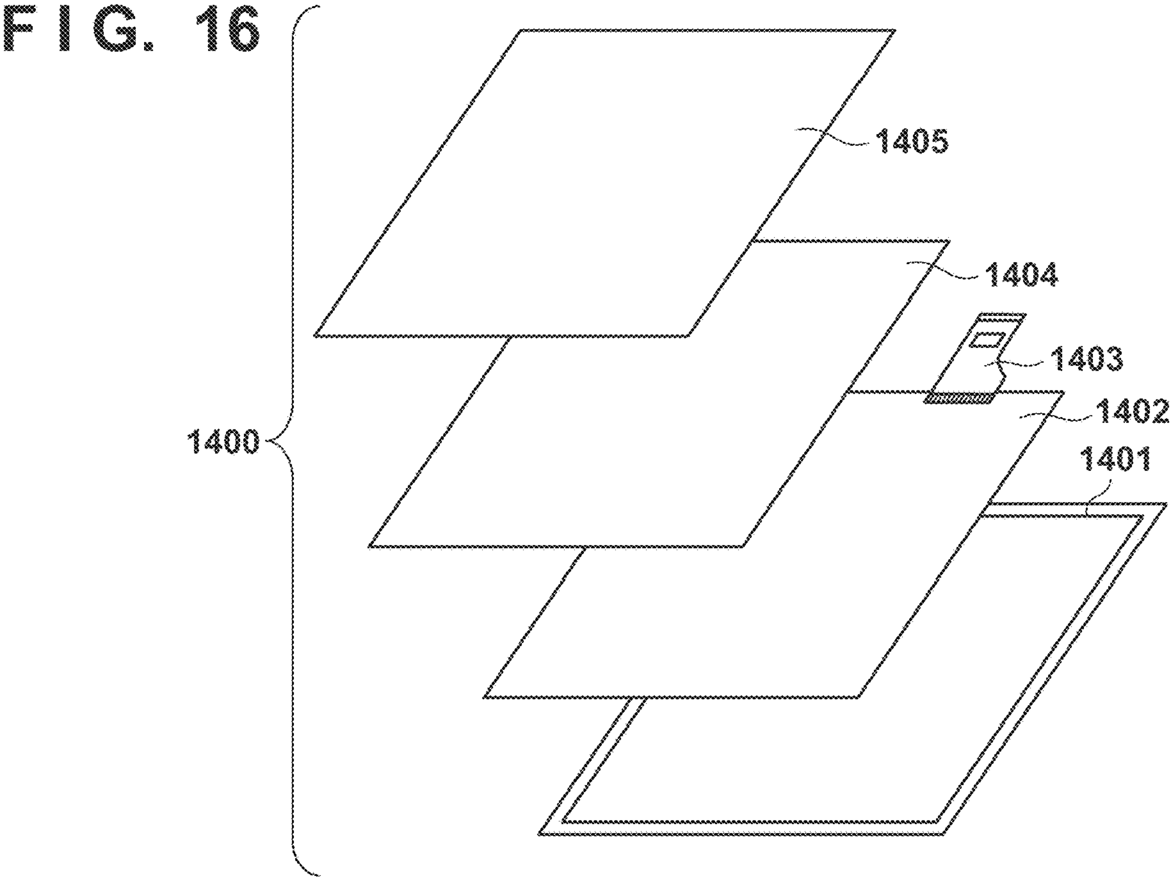
FIG. 16 is a view showing an example of the configuration of an illumination apparatus.

FIG. 16 is a schematic view showing an example of an illumination apparatus 1400 using the above-described light emitting apparatus 10. The illumination apparatus 1400 can include a housing 1401, a light source 1402, a circuit board 1403, an optical film 1404, and a light diffusing unit 1405. The light emitting apparatus 10 can be applied to the light source 1402. The optical film 1404 can be a filter that improves the color rendering of the light source. When performing lighting-up or the like, the light diffusing unit 1405 can throw the light of the light source over a broad range by effectively diffusing the light. The illumination apparatus can also include a cover on the outermost portion, as needed. The illumination apparatus 1400 can include both or one of the optical film 1404 and the light diffusing unit 1405.

The illumination apparatus 1400 is, for example, an apparatus for illuminating the interior of the room. The illumination apparatus 1400 can emit white light, natural white light, or light of any color from blue to red. The illumination apparatus 1400 can also include a light control circuit for controlling these light components. The illumination apparatus 1400 can also include a power supply circuit connected to the light emitting apparatus 10 functioning as the light source 1402. The power supply circuit is a circuit for converting an AC voltage into a DC voltage. White has a color temperature of 4,200 K, and natural white has a color temperature of 5,000 K. The illumination apparatus 1400 may also include a color filter. In addition, the illumination apparatus 1400 can include a heat radiation unit. The heat radiation unit radiates the internal heat of the apparatus to the outside of the apparatus, and examples are a metal having a high specific heat and liquid silicon.

Figure 17:
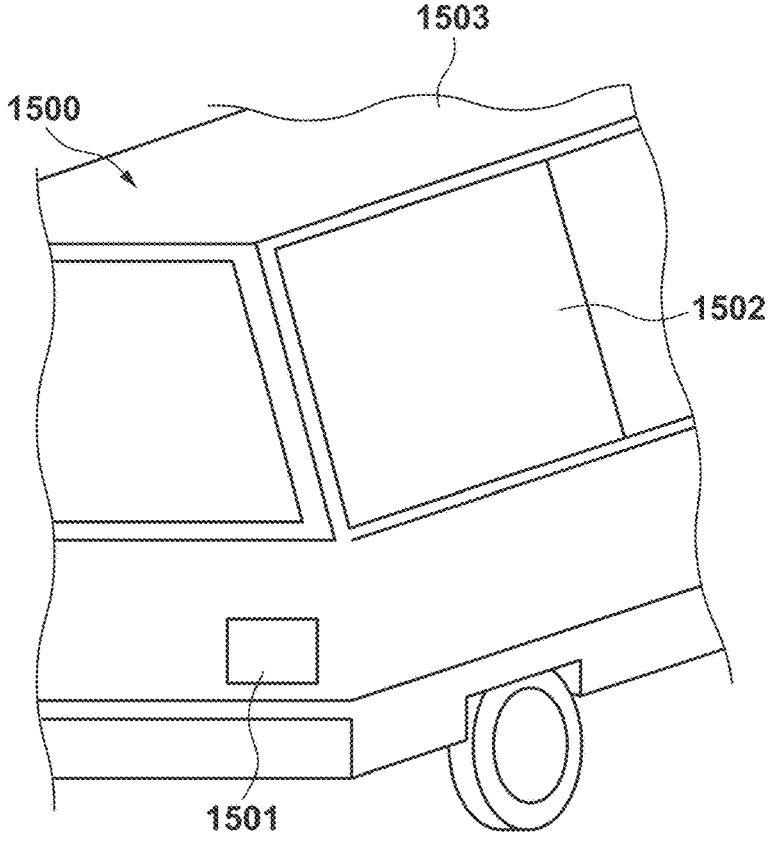
FIG. 17 is a view showing an example of a moving body.

FIG. 17 is a schematic view of an automobile 1500 having a taillight as an example of a vehicle lighting appliance using the above-described light emitting apparatus 10. An automobile 1500 has a taillight 1501, and can have a form in which the taillight 1501 is turned on when performing a braking operation or the like. The above-described light emitting apparatus 10 can be used as a headlight serving as a vehicle lighting appliance. The automobile is an example of a moving body, and the moving body may be a ship, a drone, an aircraft, a railroad car, an industrial robot, or the like. The moving body may include a main body and a lighting appliance provided in the main body. The lighting appliance may be used to make a notification of the current position of the main body.

The light emitting apparatus 10 can be applied to the taillight 1501. The taillight 1501 can include a protection member for protecting the light emitting apparatus 10 functioning as the taillight 1501. The material of the protection member is not limited as long as the material is a transparent material with a strength that is high to some extent, and an example is polycarbonate. The protection member may be made of a material obtained by mixing a furandicarboxylic acid derivative, an acrylonitrile derivative, or the like in polycarbonate.

The automobile 1500 can include a vehicle body 1503, and a window 1502 attached to the vehicle body 1503. This window can be a window for checking the front and back of the automobile, and can also be a transparent display such as a head-up display. For this transparent display, the light emitting apparatus 10 may be used. In this case, the constituent materials of the electrodes and the like of the light emitting apparatus 10 are formed by transparent members.

Further application examples of the light emitting apparatus 10 will be described with reference to FIGS. 18A and 18B. The light emitting apparatus 10 can be applied to a system that can be worn as a wearable device such as smartglasses, a Head Mounted Display (HMD), or a smart contact lens. An image capturing display apparatus used for such application examples includes an image capturing apparatus capable of photoelectrically converting visible light and a light emitting apparatus capable of emitting visible light.

Figure 18A:
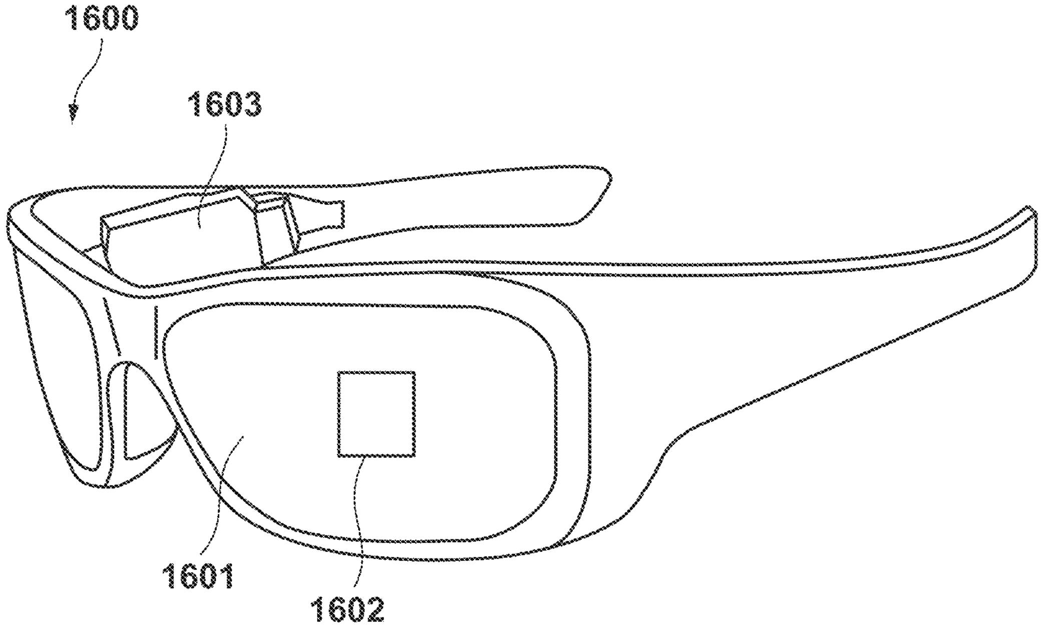
FIGS. 18A and 18B are views each showing an example of a wearable device.

FIG. 18A is a view showing glasses 1600 (smartglasses) according to one application example. An image capturing apparatus 1602 such as a CMOS sensor or an SPAD is provided on the surface side of a lens 1601 of the glasses 1600. In addition, the light emitting apparatus 10 is provided on the back surface side of the lens 1601.

The glasses 1600 further include a control apparatus 1603. The control apparatus 1603 functions as a power supply that supplies electric power to the image capturing apparatus 1602 and the above-described light emitting apparatus 10. In addition, the control apparatus 1603 controls the operations of the image capturing apparatus 1602 and the light emitting apparatus 10. An optical system configured to condense light to the image capturing apparatus 1602 is formed on the lens 1601.

Figure 18B:
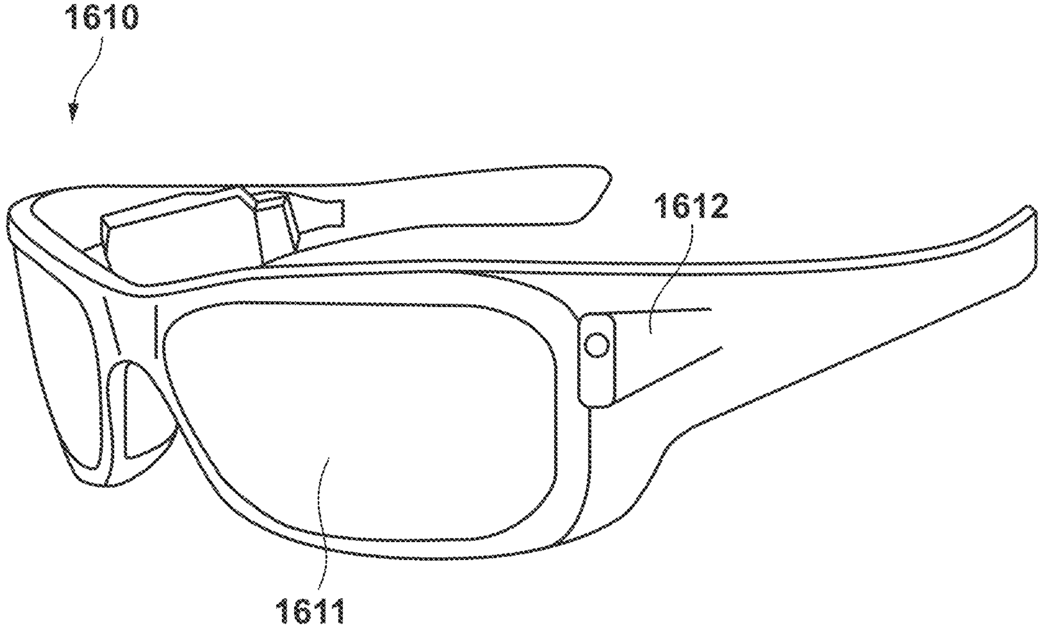

FIG. 18B is a view showing glasses 1610 (smartglasses) according to one application example. The glasses 1610 include a control apparatus 1612, and an image capturing apparatus corresponding to the image capturing apparatus 1602 and the light emitting apparatus 10 are mounted on the control apparatus 1612. The image capturing apparatus in the control apparatus 1612 and an optical system configured to project light emitted from the light emitting apparatus 10 are formed in a lens 1611, and an image is projected to the lens 1611. The control apparatus 1612 functions as a power supply unit that supplies electric power to the image capturing apparatus and the light emitting apparatus 10, and controls the operations of the image capturing apparatus and the light emitting apparatus 10. The control apparatus 1612 may include a line-of-sight detection unit that detects the line of sight of a wearer. The detection of a line of sight may be done using infrared rays. An infrared ray emitting unit emits infrared rays to an eyeball of the user who is gazing at a displayed image. An image capturing unit including a light receiving element detects reflected light of the emitted infrared rays from the eyeball, thereby obtaining a captured image of the eyeball. A reduction unit for reducing light from the infrared ray emitting unit to the display unit in a planar view is provided, thereby reducing deterioration of image quality.

The line of sight of the user to the displayed image is detected from the captured image of the eyeball obtained by capturing the infrared rays. An arbitrary known method can be applied to the line-of-sight detection using the captured image of the eyeball. As an example, a line-of-sight detection method based on a Purkinje image obtained by reflection of irradiation light by a cornea can be used.

More specifically, line-of-sight detection processing based on pupil center corneal reflection is performed. Using pupil center corneal reflection, a line-of-sight vector representing the direction (rotation angle) of the eyeball is calculated based on the image of the pupil and the Purkinje image included in the captured image of the eyeball, thereby detecting the line-of-sight of the user.

The light emitting apparatus 10 according to the embodiment of the present disclosure can include an image capturing apparatus including a light receiving element, and control a displayed image based on the line-of-sight information of the user from the image capturing apparatus.

More specifically, the light emitting apparatus 10 decides a first visual field region at which the user is gazing and a second visual field region other than the first visual field region based on the line-of-sight information. The first visual field region and the second visual field region may be decided by the control apparatus of the light emitting apparatus 10, or those decided by an external control apparatus may be received. In the display region of the light emitting apparatus 10, the display resolution of the first visual field region may be controlled to be higher than the display resolution of the second visual field region. That is, the resolution of the second visual field region may be lower than that of the first visual field region.

In addition, the display region includes a first display region and a second display region different from the first display region, and a region of higher priority is decided from the first display region and the second display region based on line-of-sight information. The first display region and the second display region may be decided by the control apparatus of the light emitting apparatus 10, or those decided by an external control apparatus may be received. The resolution of the region of higher priority may be controlled to be higher than the resolution of the region other than the region of higher priority. That is, the resolution of the region of relatively low priority may be low.

Note that AI may be used to decide the first visual field region or the region of higher priority. The AI may be a model configured to estimate the angle of the line of sight and the distance to a target ahead the line of sight from the image of the eyeball using the image of the eyeball and the direction of actual viewing of the eyeball in the image as supervised data. The AI program may be held by the light emitting apparatus 10, the image capturing apparatus, or an external apparatus. If the external apparatus holds the AI program, it is transmitted to the light emitting apparatus 10 via communication.

When performing display control based on line-of-sight detection, smartglasses further including an image capturing apparatus configured to capture the outside can be applied. The smartglasses can display captured outside information in real time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-021447, filed Feb. 15, 2024, which is hereby incorporated by reference herein in its entirety.

What is claimed is:

1. A light emitting apparatus comprising:

a pixel array portion including (1) a plurality of pixels arrayed to form a plurality of rows and a plurality of columns, and (2) a plurality of signal lines extending in a column direction, wherein each of the plurality of signal lines is divided into a plurality of sub-signal lines including a first sub-signal line and a second sub-signal line, wherein for the pixels in a column included in the plurality of columns, (1) a signal generated using an output signal of a reference voltage generation circuit is provided via the first sub-signal line to a part of the pixels and (2) the signal generated using the output signal of the reference voltage generation circuit is provided via the second sub-signal line to another part of the pixels, wherein the light emitting apparatus includes a first substrate and a second substrate, which are stacked on each other, wherein the first substrate includes the pixel array portion, wherein the second substrate includes (1) a signal output circuit configured to output the signal generated using the output signal of the reference voltage generation circuit, (2) a signal line switching circuit configured to switch a connection destination of an output of the signal output circuit between the plurality of sub-signal lines, and (3) the reference voltage generation circuit, wherein the signal output circuit includes a column DAC circuit configured to generate an analog signal using the output signal of the reference voltage generation circuit, and wherein the signal output circuit outputs respective luminance signals based on the analog signal to the first sub-signal line and the second sub-signal line through the signal line switching circuit.

2. The apparatus according to claim 1, wherein the signal line switching circuit includes a plurality of selectors configured to select, for each pixel column, one of the plurality of sub-signal lines as the connection destination of the output of the signal output circuit.

3. The apparatus according to claim 1, wherein the signal output circuit further includes a column driver circuit configured to output the luminance signal ac in accordance with the analog signal from the column DAC circuit.

4. The apparatus according to claim 1, wherein the first sub-signal line is connected to the second substrate via a first connecting portion provided on the first substrate, wherein the second sub-signal line is connected to the second substrate via a second connecting portion provided on the first substrate, and wherein the first connecting portion and the second connecting portion are provided at end portions of the first sub-signal line and the second sub-signal line on sides close to each other.

5. The apparatus according to claim 1, wherein the first sub-signal line is connected to the second substrate via a first connecting portion provided on the first substrate, wherein the second sub-signal line is connected to the second substrate via a second connecting portion provided on the first substrate, and wherein the first connecting portion and the second connecting portion are provided at end portions of the first sub-signal line and the second sub-signal line on sides far apart from each other.

6. The apparatus according to claim 1, wherein where a first region is one of two regions obtained by dividing a region including the plurality of pixels into two parts by a line parallel to a row direction, and a second region is the other of the two regions, (1) the first sub-signal line is provided in the first region for a column, and (2) the second sub-signal line is provided in the second region for the column.

7. The apparatus according to claim 1, wherein the plurality of sub-signal lines further include a third sub-signal line and a fourth sub-signal line, and wherein where a first region is one of four regions obtained by dividing a region including the plurality of pixels into four parts by lines parallel to a row direction, a second region is another of the four regions, a third region is another of the four regions, and a fourth region is another of the four regions, (1) the first sub-signal line is provided in the first region for a column, (2) the second sub-signal line is provided in the second region for the column, (3) the third sub-signal line is provided in the third region for the column, and (4) the fourth sub-signal line is provided in the fourth region for the column.

8. An image forming apparatus comprising:

a photosensitive member;

an exposure light source configured to expose the photosensitive member;

a developing device configured to apply a developing agent to the exposed photosensitive member; and a transfer device configured to transfer an image developed by the developing device to a print medium, wherein the exposure light source includes a light emitting apparatus according to claim 1.

9. A display apparatus comprising:

a light emitting apparatus according to claim 1; and an active element connected to the light emitting apparatus.

10. A photoelectric conversion apparatus comprising:

an optical unit including a plurality of lenses;

an image sensor configured to receive light having passed through the optical unit; and a display unit configured to display an image captured by the image sensor, wherein the display unit includes a light emitting apparatus according to claim 1.

11. An electronic device comprising:

a display unit including a light emitting apparatus according to claim 1;

a housing provided with the display unit; and a communication unit provided in the housing and configured to perform external communication.

12. An illumination apparatus comprising:

a light source including a light emitting apparatus according to claim 1; and one of a light diffusing unit and an optical film, through which light emitted by the light source is transmitted.

13. A moving body comprising:

a lighting appliance including a light emitting apparatus according to claim 1; and a main body provided with the lighting appliance.

14. A wearable device comprising:

a display apparatus configured to display an image, wherein the display apparatus includes a light emitting apparatus according to claim 1.

* * * * *